US010309061B2

(12) United States Patent
Chtourou et al.

(10) Patent No.: US 10,309,061 B2
(45) Date of Patent: Jun. 4, 2019

(54) METHODS FOR MAKING REPULPABLE PAPER STRINGS AND STRAPS THROUGH PULTRUSION PROCESS AND RELATED DEVICES FOR THE SAME

(71) Applicant: Enterprises International, Inc., Hoquiam, WA (US)

(72) Inventors: Halim Chtourou, Kirkland (CA); Michelle Agnes Ricard, Pointe-des-Cascades (CA); Natalie Pagé, Laval (CA); Guy Njamen Tchapda, Montréal (CA); Michael Lee Reynolds, Hoquiam, WA (US); Lyman Arthur Biggar, Fredericton (CA)

(73) Assignee: Enterprises International, Inc., Hoquiam, WA (US)

( * ) Notice: Subject to any disclaimer, the term of this patent is extended or adjusted under 35 U.S.C. 154(b) by 199 days.

(21) Appl. No.: 15/172,012

(22) Filed: Jun. 2, 2016

(65) Prior Publication Data
US 2016/0355981 A1     Dec. 8, 2016

Related U.S. Application Data

(60) Provisional application No. 62/170,443, filed on Jun. 3, 2015.

(51) Int. Cl.
*D21H 25/00*      (2006.01)
*D21H 21/14*      (2006.01)
(Continued)

(52) U.S. Cl.
CPC .........  *D21H 25/005* (2013.01); *B31D 1/0056* (2013.01); *B31F 1/0074* (2013.01);
(Continued)

(58) Field of Classification Search
CPC ... B65B 2210/02; B65B 35/405; B65B 35/44; B65B 59/005; B65B 27/12;
(Continued)

(56) References Cited

U.S. PATENT DOCUMENTS 1,815,163 A    7/1931    Sackner
1,972,607 A    9/1934    Strawn
(Continued)

FOREIGN PATENT DOCUMENTS

WO    03/101872 A1    12/2003
WO    2005/108050 A1    11/2005
WO    2012/097446 A1    7/2012

OTHER PUBLICATIONS

International Search Report and Written Opinion, dated Sep. 15, 2016, for International Application No. PCT/US2016/035445, 11 pages.
(Continued)

*Primary Examiner* — Matthew J Daniels
*Assistant Examiner* — Yunju Kim
(74) *Attorney, Agent, or Firm* — Seed Intellectual Property Law Group LLP

(57) ABSTRACT

A method for forming paper straps is provided. The method may include providing a paper strip from a base sheet and directing the paper strip through a first die to form an intermediate string. The method may further include directing the intermediate string from the first die through a second die, the intermediate string exiting the second die in a substantially non-twisted state. Related apparatuses and devices to form paper straps are also provided.

37 Claims, 19 Drawing Sheets

(51) Int. Cl.
  *D21H 21/10* (2006.01)
  *B31D 1/00* (2017.01)
  *B31F 1/00* (2006.01)
  *D02G 3/08* (2006.01)
  *B65B 27/12* (2006.01)

(52) U.S. Cl.
  CPC ............... *D02G 3/08* (2013.01); *D21H 21/10* (2013.01); *D21H 21/14* (2013.01); *B65B 27/12* (2013.01)

(58) Field of Classification Search
  CPC .. B31D 1/0056; B31D 1/0062; B31D 1/0093; B31F 1/0074; B31F 1/0003; B31F 1/0006; B31F 5/04; D02G 3/08; D02G 3/00; D21H 21/10; D21H 21/14; D21H 25/005; B29C 70/52–528; B29C 70/521; B29K 2029/00; B29K 2029/04; B29K 2229/00; B29K 2229/04
  USPC .................. 264/136, 137; 162/158; 156/200
  See application file for complete search history.

(56) References Cited

U.S. PATENT DOCUMENTS

| | | | |
|---|---|---|---|
| 2,045,498 A | | 6/1936 | Stevenson |
| 2,051,674 A | | 8/1936 | Barnum |
| 2,097,299 A | | 10/1937 | Millett |
| 2,284,321 A | | 5/1942 | Kimball |
| 2,322,731 A | | 6/1943 | Repass |
| 2,388,745 A | | 11/1945 | Katz |
| 2,407,926 A | | 9/1946 | Hamilton |
| 2,499,463 A | | 3/1950 | Crary |
| 2,562,454 A | | 7/1951 | Grant |
| 2,871,652 A | | 2/1959 | Schwartz |
| 2,896,397 A | | 7/1959 | Steen |
| 3,126,312 A | | 3/1964 | Nickerson |
| 3,164,069 A | * | 1/1965 | Wilkie ..................... D02G 3/08 156/200 |
| 3,330,409 A | | 7/1967 | Jorgensen |
| 3,447,301 A | | 6/1969 | Orser |
| 3,684,622 A | | 8/1972 | Goldsworthy |
| 3,735,579 A | | 5/1973 | Catlos |
| 4,414,258 A | | 11/1983 | Corbin, Sr. |
| 5,066,363 A | | 11/1991 | Lee et al. |
| 5,350,630 A | | 9/1994 | Schreiner et al. |
| 5,540,797 A | | 7/1996 | Wilson |
| 5,556,496 A | | 9/1996 | Sumerak |
| 6,007,656 A | | 12/1999 | Heikkila et al. |
| 6,022,618 A | | 2/2000 | Arai |
| 6,284,094 B1 | | 9/2001 | Carpenter et al. |
| 6,440,544 B1 | | 8/2002 | Rodriguez |
| 6,955,735 B2 | | 10/2005 | Kusek |
| 7,118,648 B2 | | 10/2006 | Dever et al. |
| 7,487,629 B2 | | 2/2009 | Peacock |
| 7,770,369 B2 | | 8/2010 | Doyle et al. |
| 7,794,816 B2 | | 9/2010 | Rodriguez |
| 7,950,324 B2 | | 5/2011 | Doyle et al. |
| 8,684,722 B1 | | 4/2014 | Johnson et al. |
| 8,844,255 B2 | | 9/2014 | Ban |
| 2003/0235687 A1 | | 12/2003 | Peacock |
| 2004/0131825 A1 | | 7/2004 | Dever et al. |
| 2004/0140592 A1 | | 7/2004 | Barlow et al. |
| 2004/0197538 A1 | | 10/2004 | Okugawa et al. |
| 2005/0008817 A1 | | 1/2005 | Rodriguez et al. |
| 2005/0096574 A1 | * | 5/2005 | Wibaux ................. H05B 3/342 602/2 |
| 2005/0186417 A1 | | 8/2005 | Rodriguez |
| 2006/0275580 A1 | | 12/2006 | Rodriguez |
| 2007/0068641 A1 | | 3/2007 | Dever et al. |
| 2008/0121887 A1 | | 5/2008 | Choi et al. |
| 2009/0258181 A1 | | 10/2009 | Eispert et al. |
| 2011/0277947 A1 | | 11/2011 | Hua et al. |
| 2012/0080156 A1 | | 4/2012 | Laleg et al. |
| 2013/0017394 A1 | | 1/2013 | Hua et al. |
| 2014/0332996 A1 | * | 11/2014 | Kiilunen ............... B29C 70/521 264/137 |

OTHER PUBLICATIONS

Deutsches Elektronen-Synchrotron DESY, "Stronger than steel: Scientists spin ultra-strong cellulose fibers," Jun. 2, 2014, *ScienceDaily*, URL=www.sciencedaily.com/releases/2014/06/140602101605.htm, download date Nov. 15, 2014, 2 pages.

Hubbe, "Bonding Between Cellulosic Fibers in the Absence and Presence of Dry-Strength Agents—A Review," *BioResources* 1(2):281-318, 2006.

International Preliminary Report on Patentability, dated Dec. 5, 2017, for International Application No. PCT/US2016/035445, 6 pages.

* cited by examiner

METHODS FOR MAKING REPULPABLE PAPER STRINGS AND STRAPS THROUGH PULTRUSION PROCESS AND RELATED DEVICES FOR THE SAME

BACKGROUND

Technical Field

The present disclosure generally relates to paper strings and straps and, more particularly, to repulpable paper straps formed by pultrusion.

Description of the Related Art

Strapping machines are often used to bundle objects. Strapping machines can apply straps about a stack so as to bundle those objects together.

In some instances, conventional straps used to bundle objects, such as pulp bale, have been made from wire, steel, and plastic. Use of such materials for pulp bales has proven to be problematic because pulp bale often has to be repulped along with the strap. Repulping thus may be hindered because straps made from materials that do not support repulpability would have to be removed prior to initiating the repulping process.

To address such problems, typical solutions have included using straps made from paper for bundling pulp bales. Such conventional paper straps may be produced by twisting paper into strings, cords, or twines. In some instances, conventional paper straps may be produced by folding paper strips into a paper strap. In other instances, conventional paper straps may be produced by a combination of folding and twisting paper strips into a paper strap.

Conventional paper straps, however, have resulted in paper straps having limited strength and in some instances additional difficulties in repulpability, in addition to an increase in manufacturing costs. For instance, conventional paper straps may require tight twisting to retain the string in its consolidated and cylindrically round shape, further adding to lengthy and costly manufacturing processes. Similarly, folded paper straps may require paper strips to be folded at one or more locations to form the paper strap. The multiple twists and folds in paper straps may cause the fiber and paper orientation to be continually changed, which results in the loss of strength of the paper strap. Further, the twists and folds may inhibit water penetration into the paper straps which, again, hinders repulpability of paper straps. As a result, typical solutions to address the loss of strength may require using bulkier, and thus, costlier base paper. Other solutions may require adding synthetic fibers to improve tensile strengths of conventional paper straps. However, synthetic fibers, such as rayon, glass, nylon, polypropylene, polyethylene, etc., may hinder paper strap repulpability and machine runnability.

BRIEF SUMMARY

Embodiments described herein provide methods, devices, apparatuses, and machines with efficient and robust form factors for forming paper strings and paper straps. According to one embodiment, a method for forming a paper strap may be summarized as including providing a plurality of paper strips and directing each of the plurality of paper strips through a respective first pultrusion string die to form intermediate strings. Each of the intermediate strings may be directed from the respective first pultrusion string die through a second pultrusion string die, the intermediate strings exiting the second die in a substantially non-twisted state to form non-twisted strings. The non-twisted strings may be directed through a pultrusion strap die, the non-twisted strings forming the paper strap.

According to another embodiment, a method for forming strings may be summarized as including providing a paper strip from a base sheet and directing the paper strip through a first pultrusion string die to form an intermediate string. The method may further include directing the intermediate string from the first pultrusion die through a second pultrusion string die, the intermediate string exiting the second pultrusion string die in a substantially non-twisted state to form a non-twisted string.

According to another embodiment, an apparatus for forming a paper strap may be summarized as including a paper strip delivery system, the paper strip delivery system configured to deliver a plurality of paper strips, and a plurality of a first set of pultrusion string dies, each of the first set of pultrusion string dies having a first receptacle configured to receive the plurality of paper strips and compact the paper strips into intermediate strings. The apparatus may further include a second pultrusion string die having a plurality of second receptacles, the second receptacles configured to receive the intermediate strings and compact the intermediate strings into non-twisted strings. The apparatus may further include a pultrusion strap die having a third receptacle, the third receptacle configured to receive and compact the non-twisted strings into the paper strap.

According to yet another embodiment, an apparatus for forming a paper strap may be summarized as including a paper strip delivery system, the paper strip delivery system configured to deliver a plurality of paper strips, and a plurality of a first set of pultrusion string dies, each of the first set of pultrusion string dies having a first receptacle configured to receive the plurality of paper strips and compact the paper strips into intermediate strings. The apparatus may further include a second pultrusion string die having a plurality of second receptacles, the second receptacles configured to receive the intermediate strings and compact the intermediate strings into non-twisted strings, and a pultrusion strap die having a third receptacle, the third receptacle configured to receive and compact the non-twisted strings into the paper strap.

DETAILED DESCRIPTION

In the following description, certain specific details are set forth in order to provide a thorough understanding of various disclosed embodiments. One skilled in the relevant art will recognize that embodiments may be practiced without one or more of these specific details. In other instances, well-known structures and devices associated with paper strap machines and related apparatuses and methods may not be shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
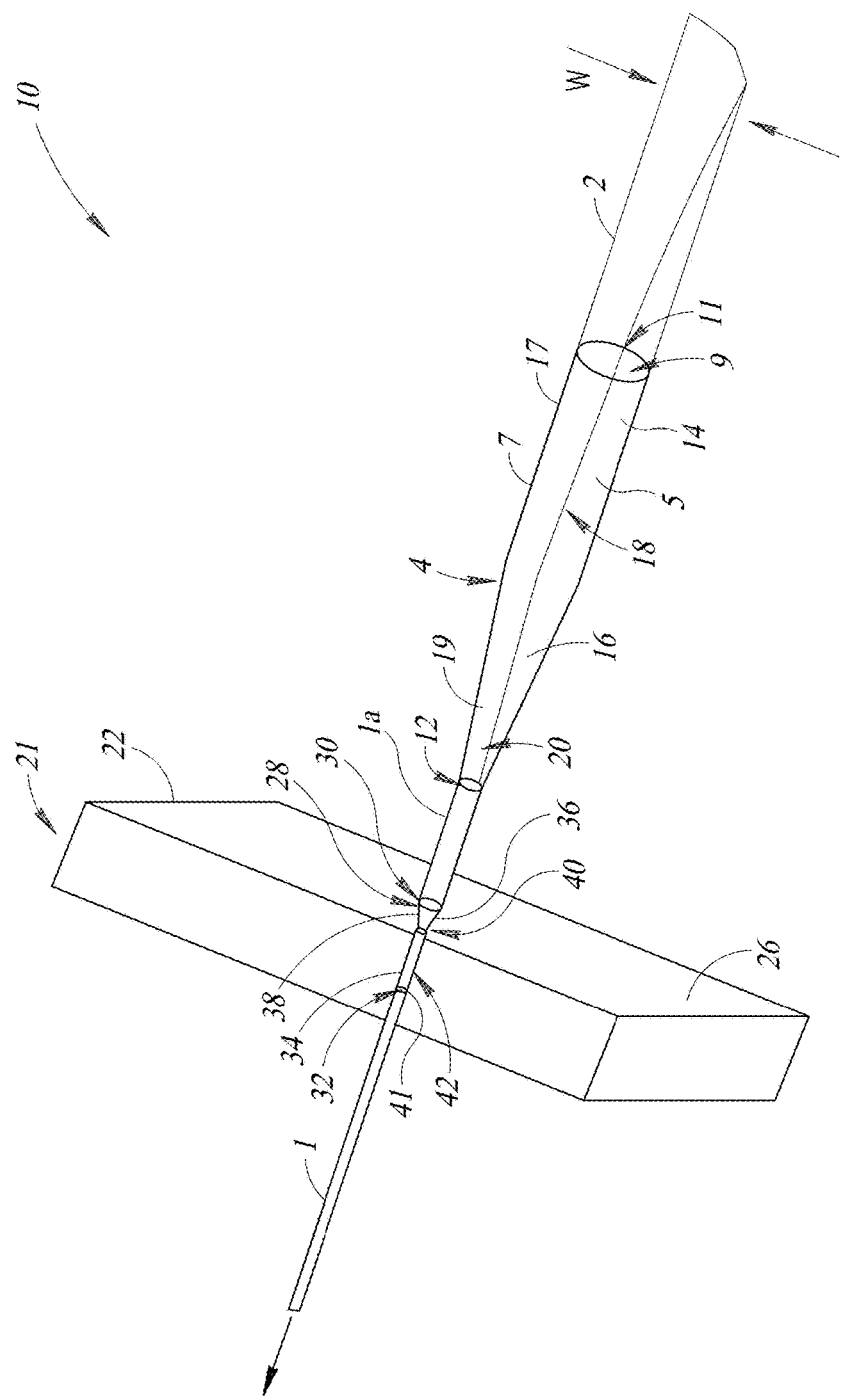
FIG. 1 is a perspective view of an apparatus to form a non-twisted string, according to one embodiment.

FIG. 1 illustrates an apparatus 10 for forming a non-twisted string 1, according to one embodiment. The apparatus 10 may include a rotatable reel (not shown) about which a base paper is wound. The wound base paper can form a roll (e.g., a tightly wound roll) that can be unwound as the base paper is pulled from the rotating reel to provide a paper strip 2. In some embodiments, the paper strip 2 may be coated with an adhesive. The adhesive may be a water-soluble adhesive, such as polyvinyl alcohol ("PVOH"). For example, the base paper may be unwound from the rotatable reel and directed to a coating system which may be configured to coat the base paper and supply a coated paper strip 2. In some embodiments, the base paper wound about the rotatable reel may be pre-coated with the water-soluble adhesive to supply a coated paper strip 2. In other embodiments, including the embodiment illustrated in FIG. 1, the paper strip 2 may remain uncoated and be supplied from the unwound base paper. The apparatus 10 may include additional components, such as motor-driven rollers, e.g., pinch rollers, that have been removed for clarity and, which, are configured to pull the paper strip 2 from the rotatable reel with sufficient force to cause rotation of the rotatable reel. The paper strip 2 can be selected to have a certain width W. For example, the width W of the paper strip 2 can be selected to meet certain requirements, e.g., strength requirements, end-use requirements, etc., as are discussed in more detail below.

The paper strip 2 is directed and/or pulled through a pultrusion string die 4 (e.g., a funneling die, a nozzle die, etc.). Again, the paper strip 2 may be directed and/or pulled through the pultrusion string die 4 using various means, such as pinch rollers, for example, which may be driven by motors, or the like. In the embodiment illustrated in FIG. 1, the pultrusion string die 4 is a funneling die 5, e.g., a pipette. The funneling die 5 includes a body 7 having a receptacle 9. The receptacle 9 is disposed between an entry aperture 11 and an exit aperture 12. The receptacle 9 includes a constant section portion 14 and a tapered section portion 16. The constant section portion 14 extends from the entry aperture 11 and includes a first wall 17 surrounding, and thus forming, a first volume 18. The constant section portion 14 smoothly transitions into the tapered section portion 16. The tapered section portion 16 extends from the constant section portion 14 and includes a second wall 19 surrounding, and thus forming, a second volume 20. The tapered section portion 16 tapers or necks down, terminating at the exit aperture 12. In some embodiments, a constant fixed width zone may also be included after the tapered section portion 16 (not shown). As illustrated in FIG. 1, the paper strip 2 is pulled through the funneling die 5, passing through the receptacle 9, where the funneling die 5 gradually compacts and/or consolidates the paper strip 2, such that the paper strip 2 exiting the funneling die 5 forms an intermediate string 1a, the intermediate string 1a having a substantially cylindrical shape.

The apparatus 10 also includes a pultrusion string die 21 (e.g., a funneling die, a nozzle die, etc.). The intermediate string 1a is directed and/or pulled through the pultrusion string die 21. Again, the intermediate string 1a may be pulled through the pultrusion string die 21 using various means, such as pinch rollers, for example, which may be driven by motors, or the like. In the embodiment illustrated in FIG. 1, the pultrusion string die 21 is a nozzle die 22. The nozzle die 22 includes a body 26 having a receptacle 28. The receptacle 28 is disposed between an entry aperture 30 and an exit aperture 32. The receptacle 28 includes a constant section portion 34 and a tapered section portion 36. The tapered section portion 36 extends from the entry aperture 30 and includes a first wall 38 surrounding, and thus forming, a first volume 40. The tapered section portion 36 tapers or necks down, smoothly transitioning into the constant section portion 34. The constant section portion 34 extends from the tapered section portion 36 and includes a second wall 41 surrounding, and thus forming, a second volume 42. The constant section portion 34 terminates at the exit aperture 32. The intermediate string 1a is directed and/or pulled through the nozzle die 22, passing through the receptacle 28, where the nozzle die 22 gradually compacts and/or consolidates the intermediate string 1a into the non-twisted string 1. Again, passing the intermediate string 1a through the receptacle 28 of the nozzle die 22 continues to compact and/or consolidate the intermediate string 1a, such that the non-twisted string 1 may have a substantially compact, cylindrical shape. The non-twisted string 1 formed in this manner advantageously omits and/or avoids adding additional steps associated with twisting, folding, and/or any combinations thereof.

The illustrated dies (e.g., 4, 5, 21, 22) may include other components, such as die plates, shoes, die sets, bushings, pins, etc., which have not been shown for the sake of clarity, but are within the scope of the disclosed subject matter. Further, the illustrated dies (e.g., 4, 5, 21, 22) may be made from various materials, such as aluminum, tungsten, stainless steel, low friction and high wear resistant plastic or ceramic based materials, or other suitable materials.

Figure 2:
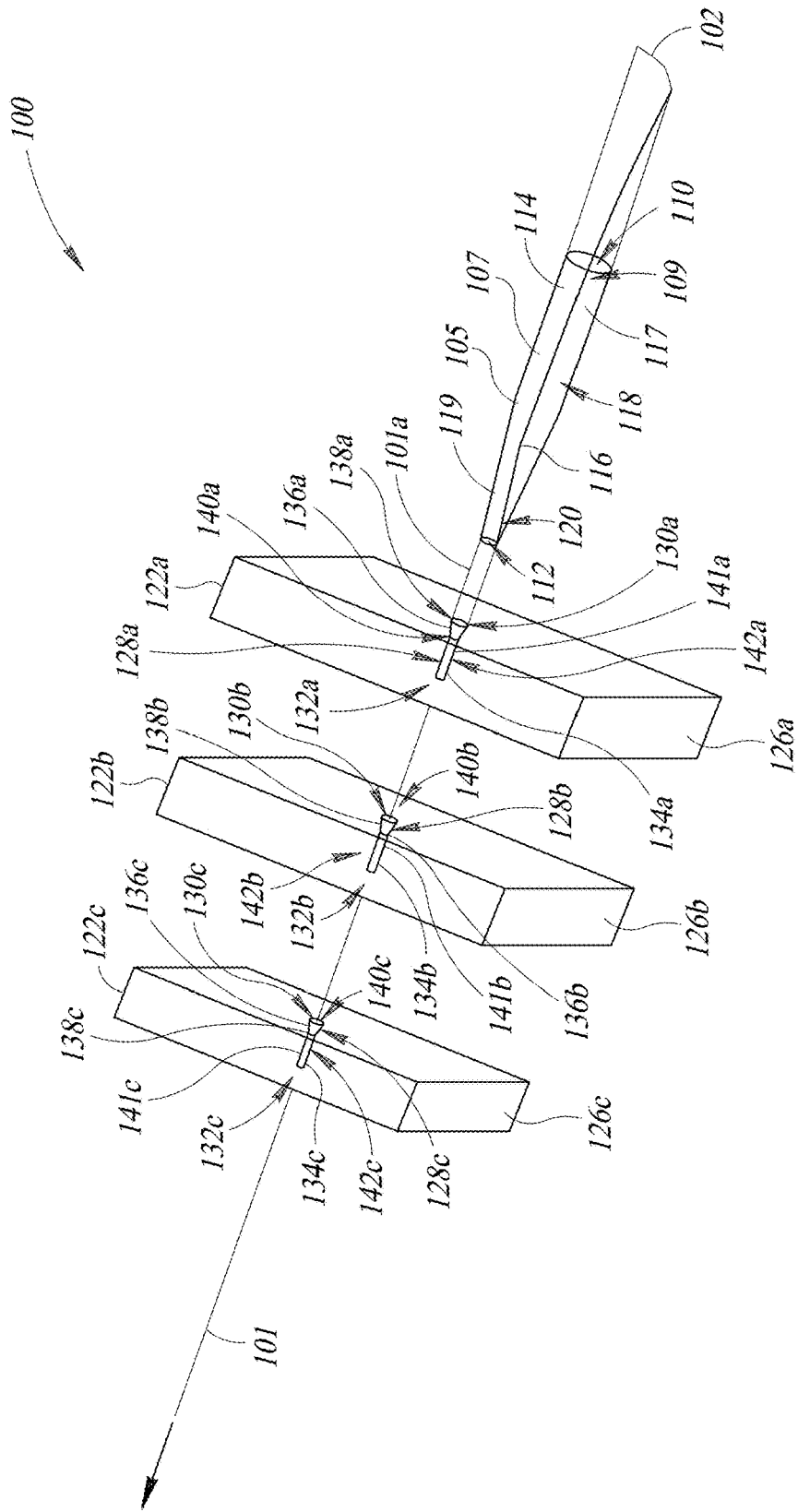
FIG. 2 is a perspective view of an apparatus to form a non-twisted string, according to another embodiment.

FIG. 2 illustrates an apparatus 100 to form a non-twisted string 101, according to another embodiment. The apparatus 100 includes a pultrusion string die, e.g., a funneling die 105, and a plurality of pultrusion string dies, e.g., nozzle dies 122a, 122b, 122c, located adjacent to the funneling die 105, through which a paper strip 102 is directed and/or pulled. Again, the funneling die 105 includes a body 107 having a receptacle 109. The receptacle 109 is disposed between an entry aperture 110 and an exit aperture 112. The receptacle 109 includes a constant section portion 114 and a tapered section portion 116. The constant section portion 114 extends from the entry aperture 110 and includes a first wall 117 surrounding, and thus forming, a first volume 118. The constant section portion 114 smoothly transitions into the tapered section portion 116. The tapered section portion 116 extends from the constant section portion 114 and includes a second wall 119 surrounding, and thus forming, a second volume 120. The tapered section portion 116 tapers or necks down, terminating at the exit aperture 112. The paper strip 102 is directed and/or pulled through the funneling die 105, passing through the receptacle 109, where the funneling die 105 gradually compacts and/or consolidates the paper strip 102, such that the paper strip 102 exiting the funneling die 105 forms an intermediate string 101a, the intermediate string 101a having a substantially cylindrical shape.

The intermediate string 101a is thereafter directed and/or pulled through the nozzle die 122a to form the non-twisted string 101. Again, the nozzle die 122a includes a body 126a having a receptacle 128a. The receptacle 128a is disposed between an entry aperture 130a and an exit aperture 132a, and includes a constant section portion 134a and a tapered section portion 136a. As discussed above, the tapered section portion 136a extends from the entry aperture 130a and includes a first wall 138a surrounding, and thus forming, a first volume 140a. The tapered section portion 136a tapers or necks down, gradually transitioning into the constant section portion 134a and includes a second wall 141a surrounding, and thus forming, a second volume 142a.

The non-twisted string 101 thereafter is directed and/or pulled through nozzle dies 122b, 122c. The nozzle die 122b also includes a body 126b having a receptacle 128b. The receptacle 128b is disposed between an entry aperture 130b and an exit aperture 132b, and includes a constant section portion 134b and a tapered section portion 136b. As discussed above, the tapered section portion 136b extends from the entry aperture 130b and includes a first wall 138b, surrounding and thus forming a first volume 140b. The tapered section portion 136b tapers or necks down, gradually transitioning into the constant section portion 134b and includes a second wall 141b surrounding, and thus forming, a second volume 142b.

The nozzle die 122c also includes a body 126c having a receptacle 128c. The receptacle 128c is disposed between an entry aperture 130c and an exit aperture 132c, and includes a constant section portion 134c and a tapered section portion 136c. As discussed above, the tapered section portion 136c extends from the entry aperture 130c and includes a first wall 138c surrounding, and thus forming, a first volume 140c. The tapered section portion 136c tapers or necks down, gradually transitioning into the constant section portion 134c and includes a second wall 141c surrounding, and thus forming, a second volume 142c.

As illustrated in FIG. 2, the nozzle dies 122a, 122b, 122c are positioned adjacent to one another. The entry and exit apertures 130a, 130b, 130c, 132a, 132b, 132c and/or the first and second volumes 140a, 140b, 140c, 142a, 142b, 142c of the corresponding receptacles 128a, 128b, 128c are selected to reduce or decrease in size and/or volume in a successive manner. For instance, the entry and exit apertures 130a, 132a of nozzle die 122a are selected to have a larger diameter than the entry and exit apertures 130b, 132b of nozzle die 122b. Similarly, the first and second volumes 140a, 142a of receptacle 128a of nozzle die 122a are selected to be larger than the first and second volumes 140b, 142b of receptacle 128b of nozzle die 122b. In this manner, the paper strip 102 can advantageously be gradually compressed and/or compacted as the paper strip 102 is directed and/or pulled through funneling die 105, the intermediate string 101a is directed and/or pulled through nozzle die 122a, and the non-twisted string 101 is directed and/or pulled through each successive nozzle dies 122b, 122c. Moreover, while the embodiment illustrated in FIG. 2 illustrates nozzle dies 122a, 122b, 122c, in other embodiments, the apparatus 100 may include any number of pultrusion string dies, such as the nozzle dies or the funneling dies, for example.

In some embodiments, one or more of the nozzle dies 122a, 122b, 122c may be configured to heat the intermediate string 101a and/or the non-twisted string 101 as the intermediate string 101a and/or the non-twisted string 101 is directed and/or pulled through the corresponding receptacles 128a, 128b, 128c. In some embodiments, including the embodiment illustrated in FIG. 2, nozzle die 122c may be configured to heat the non-twisted string 101. The nozzle die 122c may include an electrical heating system, such as coils or the like to heat the non-twisted string 101. In other embodiments, the nozzle die 122c may include other systems and methods to heat the non-twisted string 101, such as heaters, lamps, or the like, which may be configured to heat the non-twisted string 101. In this manner, the heat provided by the nozzle die 122c may facilitate compaction and/or consolidation of the non-twisted string 101. For example, when pulling the non-twisted string 101 coated with the water-soluble adhesive, such as PVOH, the heat provided by the nozzle die 122c, or application of a liquid, such as water, for example, may activate the surface tackiness of the adhesive. Activation of the surface tackiness of the water-soluble adhesive may therefore facilitate compaction and/or consolidation of the non-twisted string 101 as the non-twisted string 101 passes through the nozzle dies (e.g., 122a, 122b, 122c).

In some embodiments, the entry and exit apertures of the various dies 4, 5, 21, 22, etc. (e.g., entry apertures 11, 30, exit apertures 12, 32, etc.) and the volumes (e.g., first and second volumes 18, 20, 40, 42, etc.) are advantageously selected to impart certain strength characteristics. For example, in some embodiments, the entry apertures (e.g., 11, 30) may be selected to have an entrance diameter of about 2.4 to 2.8 mm. The exit apertures (e.g., 12, 32) may be selected to have an exit diameter of about 1.2 to 1.6 mm. In some embodiments, the tapered section portions of the dies 4, 5, 21, 22 (e.g., tapered section portions 16, 36) may be selected to have a longitudinal length of about 3 to 5 mm. Selecting the various dies in this manner facilitates compacting and/or consolidating the paper strips, such that the paper strips may have improved strength properties.

Figure 3:
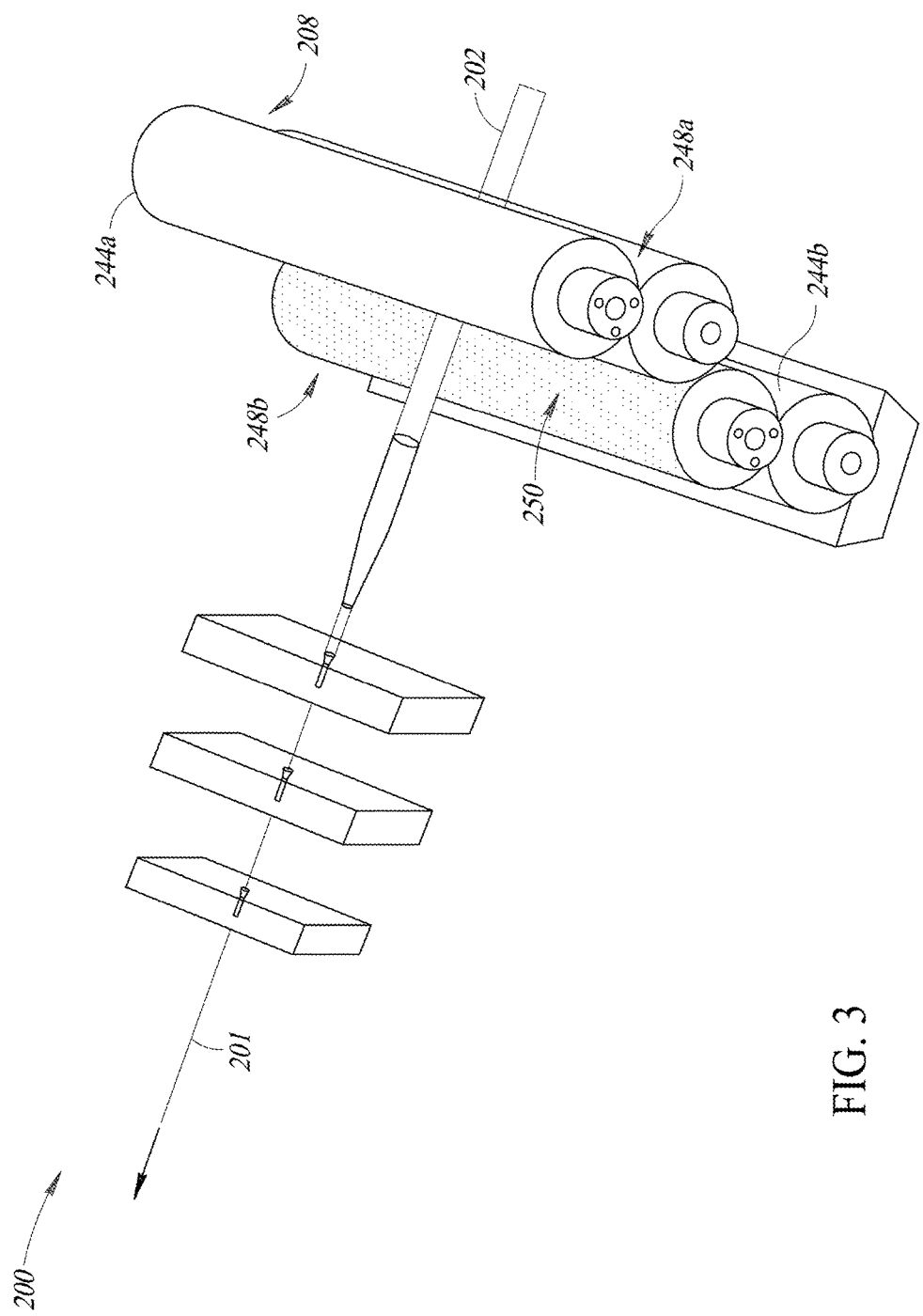
FIG. 3 is a perspective view of an apparatus to form a non-twisted string, according to another embodiment.

FIG. 3 illustrates an apparatus 200 to form a non-twisted string 201, according to another embodiment. The apparatus 200 provides a variation in which a single-side coated paper strip 202 is directed and/or pulled through a moistening system 208. In some embodiments, including the embodiment illustrated in FIG. 3, the paper strip 202 is coated on one side with a water-soluble adhesive, such as PVOH. In some embodiments, the moistening system 208 may include ultra-fine misting nozzles, a bath of water fog, a steam chamber, or other systems that apply fine quantities of liquids, such as water, to activate the adhesive coating of the paper strip 202. In some embodiments, including the embodiment illustrated in FIG. 3, the moistening system 208 includes two pairs of rollers 244a, 244b (collectively, rollers 244). In some embodiments, at least one roll of the pair of rollers 244, such as the bottom roller of the pair of lower rollers 244b, for example, is submerged in a bath of liquid. In some embodiments, the liquid may be water, or other suitable liquid. As the bottom roller of the lower rollers 244b rotates through the bath of liquid, the lower rollers 244b and the upper rollers 244a are configured to receive via outer surfaces 248b, 248a thereof the liquid, e.g., water. The surface of the top roller of the pair of lower rollers 244b is filled with the liquid via grooves 250. In particular, the grooves 250 are configured to receive the liquid, e.g., water, or other suitable liquid and moisten the outer surface 248a of the rollers 244a. The rollers 244 may rotate with respect to or with each other as the paper strip 202 is directed and/or pulled through the moistening system 208. In this manner, the moistening system 208 may moisten the paper strip 202 coated with the water-soluble adhesive. Application of the liquid, such as water, can activate the surface tackiness of the adhesive to facilitate compaction and consolidation of the non-twisted string 201. In some embodiments, the moistening system 208 may include commercially available rollers, such as Anilox™ rollers. However, other rollers which may facilitate moistening of objects passing therethrough are within the scope of the disclosed subject matter.

Figure 4:
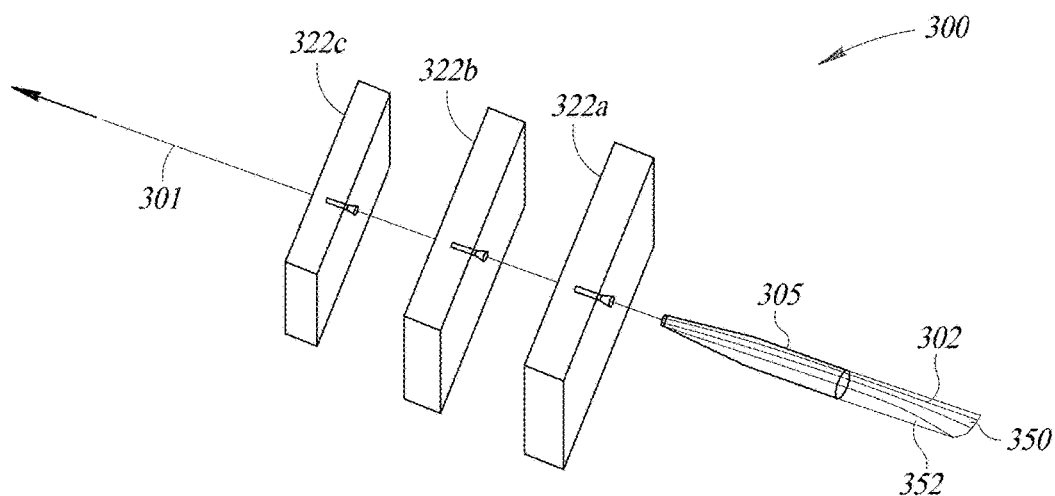
FIG. 4 is a perspective view of an apparatus to form a non-twisted string, according to another embodiment.

FIG. 4 illustrates an apparatus 300 to form a non-twisted string 301, according to another embodiment. The apparatus 300 provides a variation in which a paper strip 302 may include a plurality of longitudinally extending slits 350 to define a plurality of strip portions 352. In some embodiments, the apparatus 300 may include slicers, knives, slitters, or other suitable devices to cut, scrape, or slice the paper strip 302 longitudinally into the plurality of strip portions 352. In some embodiments, the slits 350 may be equally spaced apart in a lateral direction, such that each of the strip portions 352 extends laterally a same distance. In some embodiments, one or more of the slits 350 may be unequally spaced apart in a lateral direction, such that each of the strip portions 352 extends laterally a different distance.

As illustrated in FIG. 4, the strip portions 352 are directed and/or pulled through pultrusion string dies, e.g., funneling die 305 and a plurality of pultrusion string dies, e.g., nozzle dies 322a, 322b, 322c, as discussed above, to form the non-twisted string 301. In some embodiments, the paper strip 302 may be coated with an adhesive, such as a water soluble PVOH. Further, in some embodiments, the coated paper strip 302 may be pulled and/or directed through a moistening system (e.g., moistening system 208). In other embodiments, the paper strip 302 may remain uncoated when being pulled and/or directed through the funneling die 305.

Figure 5:
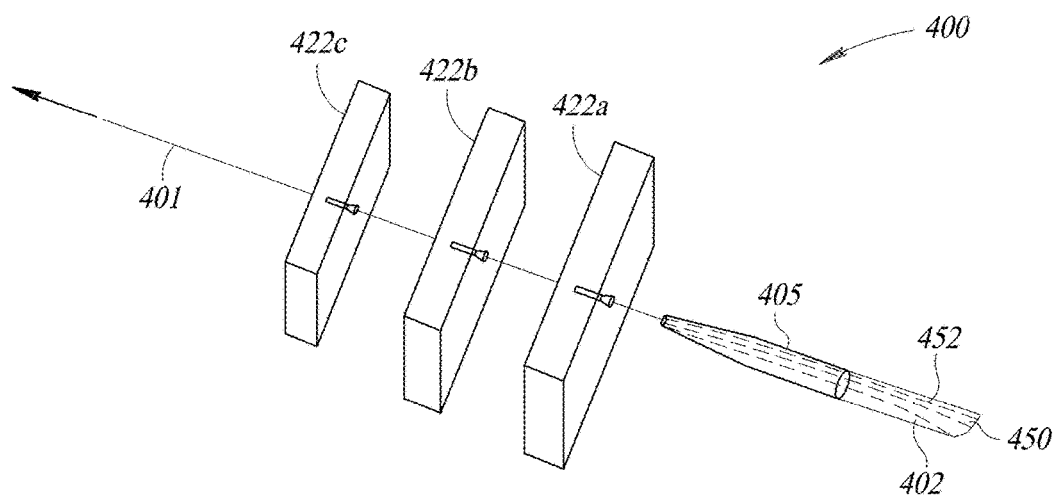
FIG. 5 is a perspective view of an apparatus to form a non-twisted string, according to another embodiment.

FIG. 5 illustrates an apparatus 400 to form a non-twisted string 401, according to another embodiment. The apparatus 400 provides a variation in which a paper strip 402 may include a plurality of longitudinally extending perforations 450 to define a plurality of strip portions 452. In some embodiments, the apparatus 400 may include perforating guns, needles, or other suitable devices to form the perforations 450. In some embodiments, the perforations 450 may be equally spaced apart in a lateral direction, such that each of the strip portions 452 extends laterally a same distance. In some embodiments, one or more of the perforations 450 may be unequally spaced apart in the lateral direction, such that each of the strip portions 452 extends laterally a different distance.

Again, as illustrated in FIG. 5, the strip portions 452 are directed and/or pulled through pultrusion string dies, e.g., funneling die 405 and a plurality of pultrusion sting dies, e.g., nozzle dies 422a, 422b, 422c, as discussed above, to form the non-twisted string 401. In some embodiments, the paper strip 402 may be coated with an adhesive, such as a water-soluble PVOH. Further, in some embodiments, the coated paper strip 402 may be pulled and/or directed through a moistening system (e.g., moistening system 208). In other embodiments, the paper strip 402 may remain uncoated when being pulled and/or directed through the funneling die 405.

The embodiments illustrated in FIGS. 4 and 5 facilitate increasing the strength properties of the non-twisted strings (e.g., non-twisted strings 1, 101, 201, 301, 401). The inventors have experimentally discovered that slicing, perforating, or generally providing strip portions (e.g., 352, 452) facilitates compacting and/or consolidating the paper strips (e.g., paper strips 302, 402) through the entry and exit apertures of the pultrusion string dies (e.g., funneling dies 305, 405 and nozzle dies 322a, 322b, 322c, 422a, 422b, 422c), which limit, inhibit, or reduce crimping and/or distortion of the paper strips (e.g., paper strips 302, 402).

Figure 6:
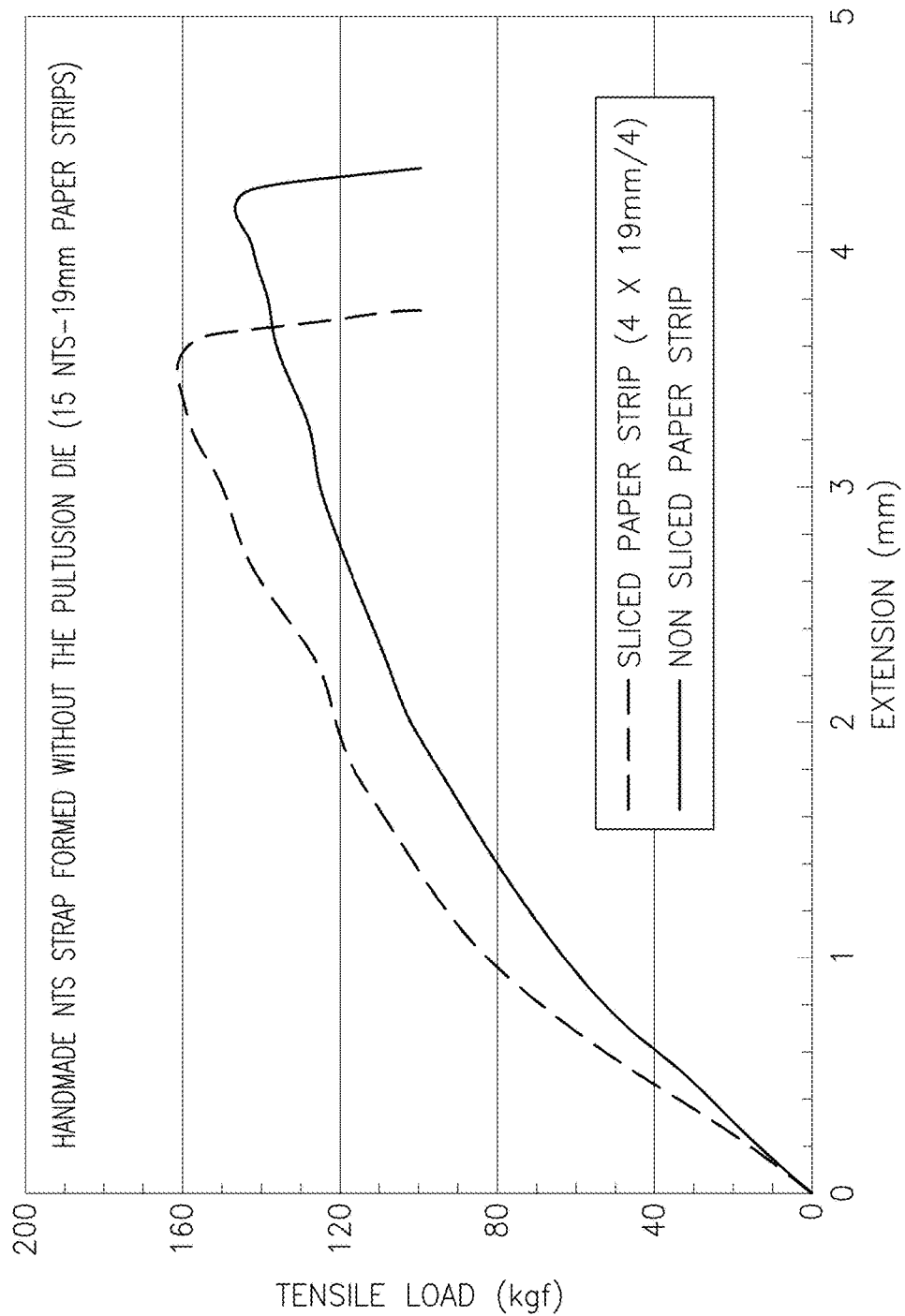
FIG. 6 is a graph illustrating ultimate tensile strengths of non-twisted strings according to embodiments of the disclosed subject matter.

FIG. 6 illustrates a graph with a vertical axis corresponding to a tensile load and a horizontal axis corresponding to an extension. A solid line corresponds to a strap assembled from 15 individually hand-pulled paper strips through a pultrusion string die to form non-twisted strings according to one embodiment, and a dotted line corresponds to a strap assembled from 15 individually hand-pulled slit paper strip portions through a pultrusion string die to form non-twisted strings according to another embodiment. The non-twisted string was formed from a paper strip having equally spaced apart slits to define four paper strip portions. The paper strip of 19 mm in width was slit into 4 longitudinal paper strip portions of equal width (19/4 mm). Both non-twisted string straps were coated with an adhesive to give a final coat weight of 12% w/w content. As shown in FIG. 6, the embodiment of the non-twisted string made from sliced strips corresponding to the dotted line exhibited an ultimate strength increase of 12%.

Figure 7:
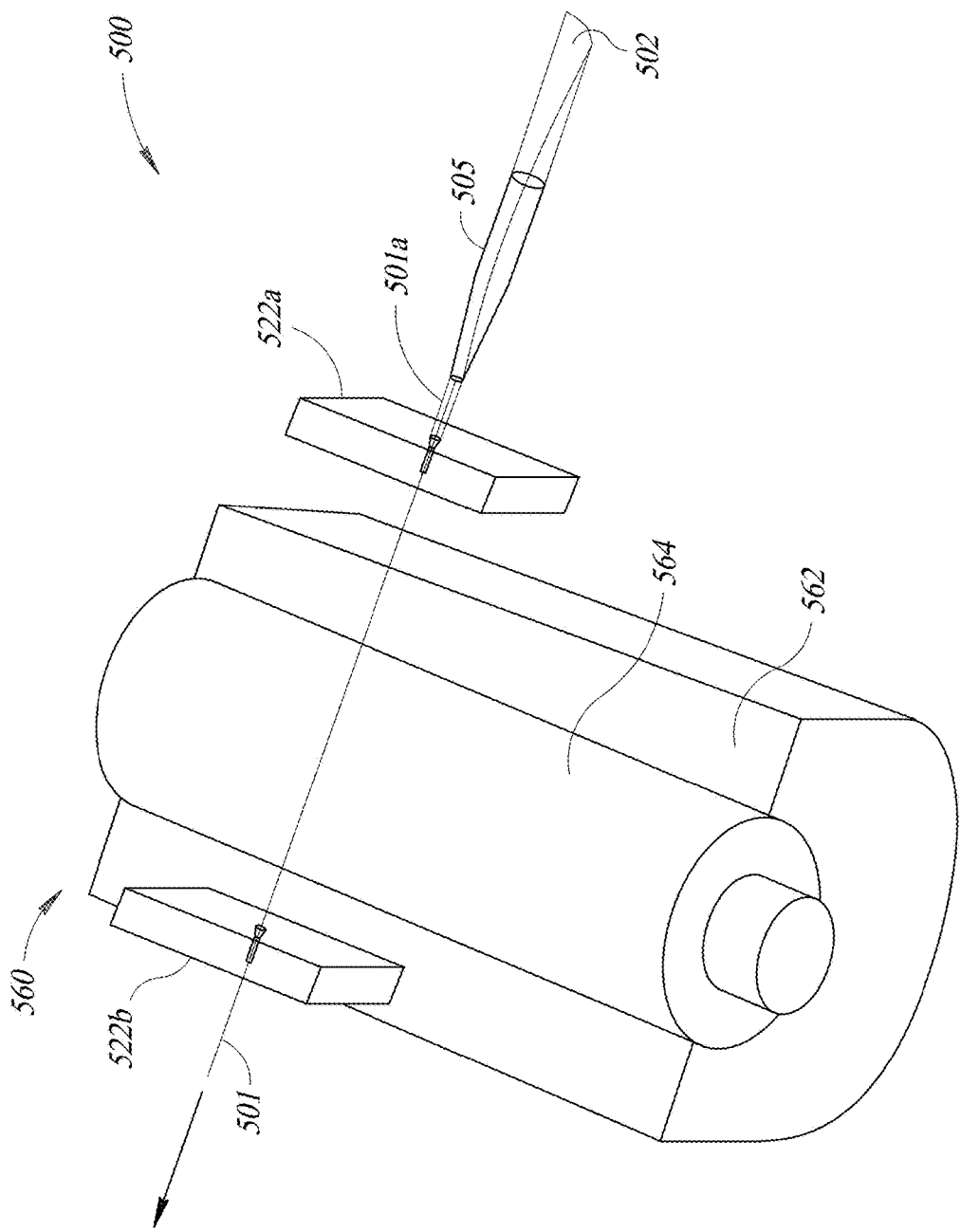
FIG. 7 is a perspective view of an apparatus to form a non-twisted string, according to another embodiment.

FIG. 7 illustrates an apparatus 500 to form a non-twisted string 501, according to another embodiment. The apparatus 500 provides a variation in which the apparatus 500 includes an impregnation system 560. The impregnation system 560 is configured to receive the non-twisted string 501 and includes a vessel 562 and a roller 564. The vessel 562 includes a liquid to coat and/or impregnate the non-twisted string 501. In some embodiments, the liquid may include a water-soluble PVOH adhesive that may contain a water retention agent such as sodium-carboxymethyl cellulose. The water retention agent in the PVOH solution acts to retain the water in solution to slow down the speed at which the paper is wetted. In contrast to paper twisted strings, where addition of water retention agent is not necessary as the tightly twisted paper strings slow water penetration, addition of the water retention agent to the water soluble adhesive medium prevents the breakdown of the wetted non-twisted strings during their pultrusion through the nozzle dies. For some commercial water soluble PVOH grades, the addition of a water retention agent such as sodium-carboxymethyl cellulose may be omitted. With respect to the string and strap flexibilities, in contrast to conventional strings and straps, where paper strip twisting conveys natural flexibility to the strings and thus to the final paper strap, the non-twisted strings and related straps are naturally less flexible. Hence, the water soluble adhesive may or shall contain a water soluble flexibilizer such as a polypropylene glycol (molecular weight=2000) to enhance the non-twisted string flexibility. As illustrated in FIG. 7, the paper strip 502 is directed and/or pulled through a pultrusion string die, e.g., funneling die 505 to form an intermediate string 501a and, thereafter, the intermediate string 501a is directed and/or pulled through a second set of pultrusion string dies, e.g., first nozzle die 522a to form the non-twisted string 501. The non-twisted string 501 is thereafter directed and/or pulled through a second nozzle die 522b with the impregnation system 560 disposed between the first nozzle die 522a and the second nozzle die 522b. As the roller 564 rotates, the non-twisted string 501 is drawn from the first nozzle die 522a and is pulled against a top surface of the PVOH wetted roller 564 to impregnate or coat the non-twisted string 501 with the water-soluble adhesive, e.g., water-soluble PVOH adhesive that may contain a water retention agent, such as carboxymethyl cellulose, and may or shall contain a water soluble flexibilizer such as a polypropylene glycol (molecular weight=2000). After impregnating the non-twisted string 501 with the water-soluble PVOH adhesive that may contain a water retention agent such as sodium-carboxymethyl cellulose, and may or shall contain a water soluble flexibilizer such as a polypropylene glycol (molecular weight=2000), the non-twisted string 501 is directed and/or pulled through the second nozzle die 522b. In some embodiments, the second nozzle die 522b may be configured to heat the non-twisted string 501. In some embodiments, the non-twisted string 501 may be pulled and/or directed through a third, a fourth, or any number of nozzle dies that may or may not be heated to form the non-twisted string 501. Further, in some embodiments, one or more vessel(s) 562 and roller(s) 564 may be placed between first nozzle die 522a and any subsequent nozzle dies, such as, nozzle die 522b, and/or any number of subsequent nozzle dies positioned after nozzle die 522b.

Further, in some embodiments, one or more of the nozzle dies may be configured to heat the non-twisted string 501. As discussed above, the nozzle die which may be configured to heat the non-twisted string 501 may include an electric heating system or other systems and methods to heat the non-twisted string, such as heaters, lamps, or the like. Again, the funneling and nozzle dies (e.g., 505, 522a, 522b) may be sized to facilitate compacting and/or consolidating the paper strip 502, as the paper strip 502 is formed into an intermediate string 501a and the non-twisted string 501. For example, the entry and exit apertures and the first and second volumes of the corresponding funneling and nozzle dies may gradually be decreased in a successive manner to facilitate compacting and/or consolidating of the paper strip 502, the intermediate string 501a, and the non-twisted string 501.

Figure 8:
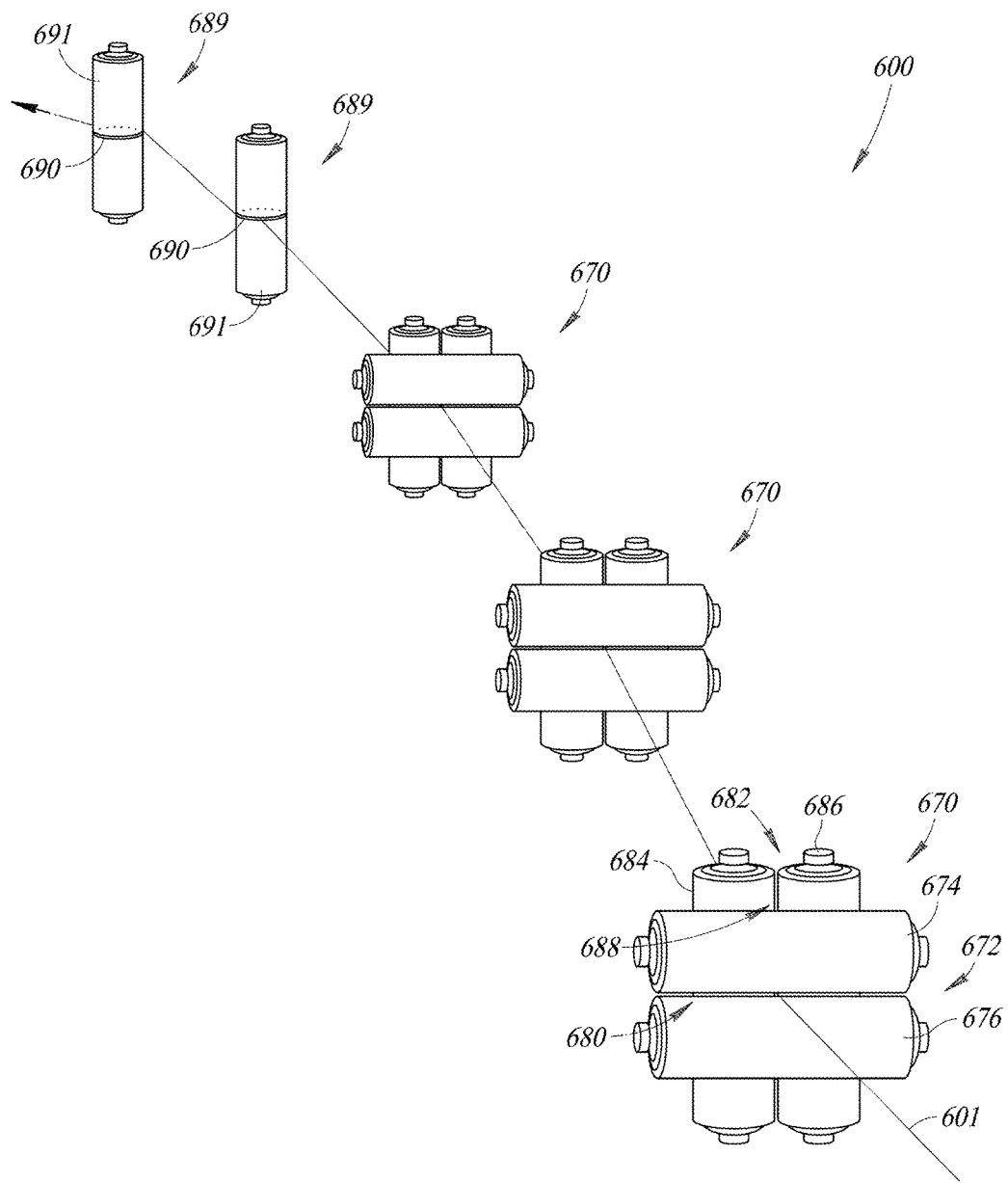
FIG. 8 is a perspective view of an apparatus to compact a non-twisted string, according to one embodiment.

FIG. 8 illustrates an apparatus 600 for compacting a non-twisted string 601 and for guiding and assembling the non-twisted strings 601 into a pultrusion strap die, according to one embodiment. While the embodiment is described in connection with non-twisted strings 601, compacting, guiding, and assembling twisted strings into a pultrusion strap die, as discussed in more detail below, are within the scope of the disclosed subject matter.

The non-twisted string 601 may be formed according to the various embodiments described herein. The apparatus 600 illustrated in FIG. 8 may optionally and/or additionally facilitate compacting and/or consolidating of the non-twisted string 601. The apparatus 600 includes a plurality of guiding and compacting roller systems 670. While the embodiment illustrated in FIG. 8 includes three guiding and compacting roller systems 670, in other embodiments, the apparatus 600 may include a pair of guiding and compacting roller systems 670, or any number of guiding and compacting roller systems 670. The guiding and compacting roller systems 670 include a first set of rollers 672, which include a top roller 674 and a bottom roller 676. The top roller 674 is positioned adjacent to the bottom roller 676 to define a first passage gap 680. The first passage gap 680 is configured to guide and compress and/or compact the non-twisted string 601 as the non-twisted string 601 passes therethrough.

The guiding and compacting roller systems 670 include a second set of rollers 682, which include a left side roller 684 and a right side roller 686. The left side roller 684 is positioned adjacent to the right side roller 686 to define a second passage gap 688. The second passage gap 688 is configured to compress and/or compact the non-twisted string 601 as the non-twisted string 601 passes therethrough. In particular, the first set of rollers 672 and the second set of rollers 682 are arranged, such that the first set of rollers 672 and the second set of rollers 682 are oriented at an angle with respect to one another. For example, the first set of rollers 672 are oriented substantially horizontally while the second set of rollers 682 are oriented substantially vertically, with the orientation of the first set of rollers 672 being substantially perpendicular to the second set of rollers 682. In other embodiments, however, the orientation of the first and second set of rollers 672, 682 may be arranged to be parallel with respect to one another, or at any other suitable angular orientation.

In some embodiments, including the embodiment illustrated in FIG. 8, the apparatus 600 may optionally and/or additionally include one or more guiding grooved rollers 689, such as a grooved bearing, for example. In some embodiments, the apparatus 600 may exclude guiding and compacting roller systems 670, and may only include guiding grooved rollers 689. In some embodiments, the apparatus 600 may include one, two, three, or any number of guiding grooved rollers 689. For example, the embodiment illustrated in FIG. 8 includes a pair of guiding grooved rollers 689 positioned adjacent to the plurality of first and second sets of rollers 672, 682. The guiding grooved rollers 689 include a recess 690 that surrounds an outer surface 691 of the grooved roller 689. The recess 690 is positioned on the outer surface 691, such that the recess 690 may receive the twisted or non-twisted string 601, as the twisted or non-twisted string 601 passes through the guiding and compacting roller systems 670. In particular, the recesses 690 of the guiding grooved rollers 689 are configured to further compact and/or consolidate the twisted or non-twisted string 601. Further, the guiding grooved rollers 689 also facilitate alignment of the twisted or non-twisted string 601, as the twisted or non-twisted string 601 may be fed to a strap formation device, as discussed in more detail below.

Figure 9:
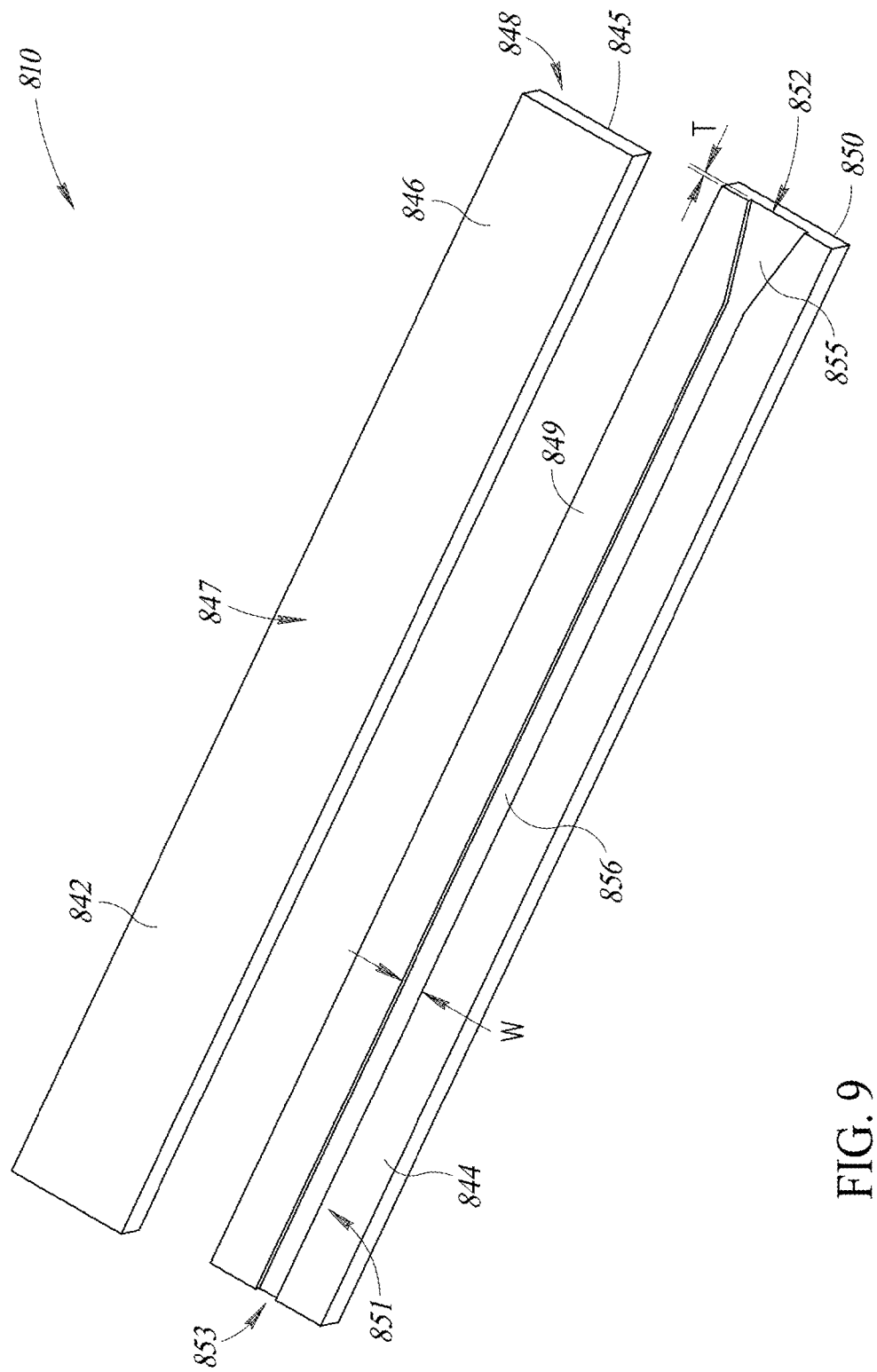
FIG. 9 is a perspective view of a pultrusion strap die, according to one embodiment.
Figure 10:
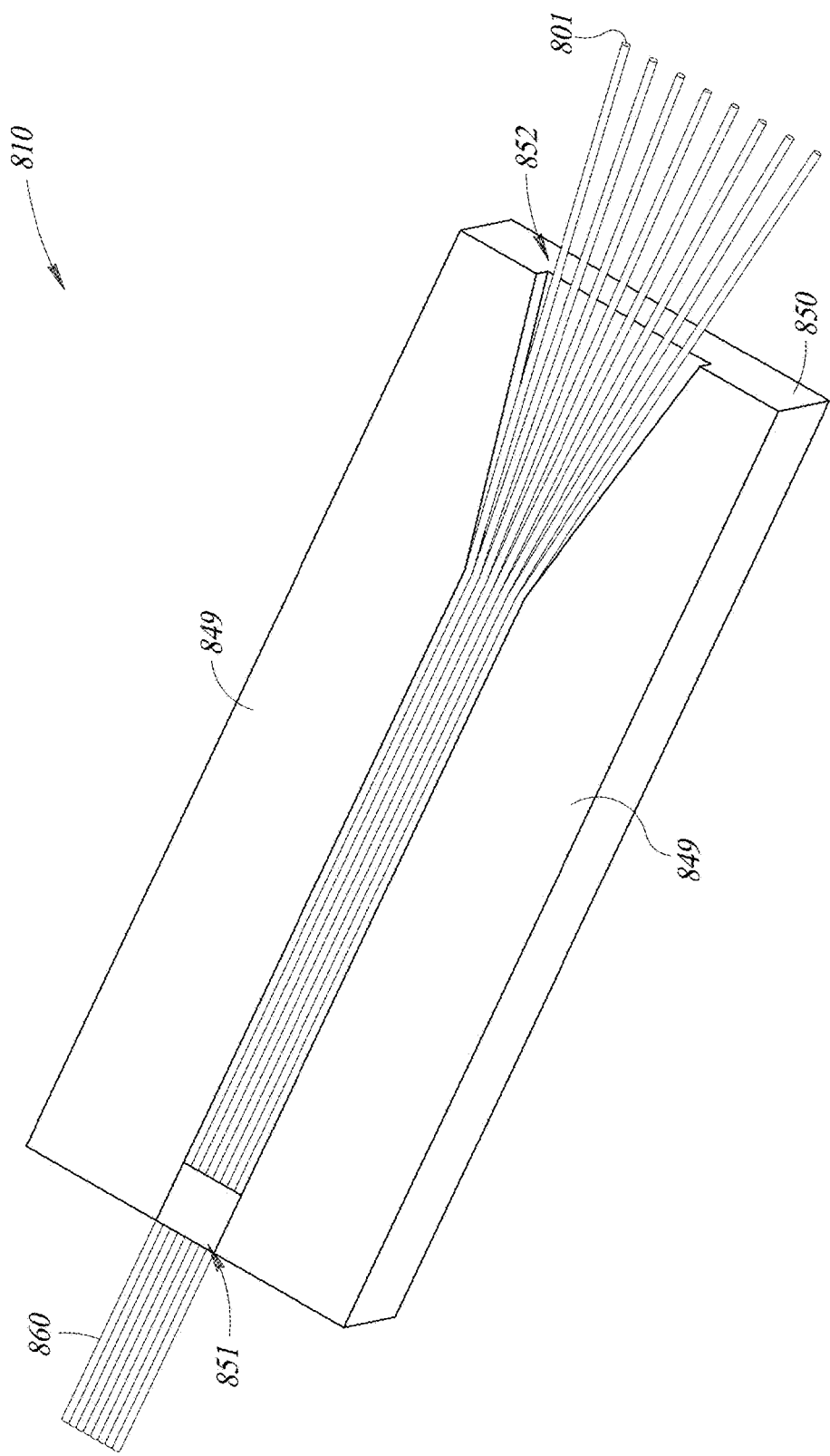
FIG. 10 is a partial perspective view of the pultrusion strap die of FIG. 9 with certain components removed for clarity, illustrating the pultrusion strap die having received a plurality of non-twisted strings.

FIGS. 9 and 10 illustrate a pultrusion strap die 810, according to one embodiment. The pultrusion strap die 810 includes an upper member 842 and a lower member 844. The upper member 842 is configured to be coupled to the lower member 844. The upper member 842 may be coupled to the lower member 844 via fasteners, or the like. The use of fasteners will permit opening the pultrusion strap die 810 to allow placement of the strings whenever needed. The upper member 842 is substantially rectangularly shaped and includes an inner side 845 and an outer side 846. The inner and outer sides 845, 846 include respective surfaces 848, 847 which are substantially flat surfaces and parallel to one another. The lower member 844 includes an inner side 849 and an outer side 850. The inner side includes a recess 851 which extends from an entrance aperture 852 to an exit aperture 853. The recess 851 includes a tapered section portion 855 and a constant section portion 856. The tapered section portion 855 tapers or necks down from the entrance aperture 852, smoothly transitioning into the constant section portion 856. The constant section portion 856 extends longitudinally from the tapered section portion 855 to the exit aperture 853. In particular, the recess 851 in the constant section portion 856 has a certain width W and a certain thickness T. The width W of the constant section portion 856 remains substantially constant and is selected to form a paper strap 860 having the width W. In some embodiments, the thickness T of the constant section portion 856 may have a range of about 1 to 1.2 mm. In other embodiments, the width W of the constant section portion 856 may be selected such that the paper strap 860 has any desired width W. The thickness T of the constant section portion 856 may be selected to be at least equally or about 0.1 to 0.2 mm more than a diameter of a non-twisted string 801 entering the entrance aperture 852. Again, selecting the constant section portion 856 to have the certain thickness T facilitates compaction and/or consolidation, and thus improves the strength properties of the paper strap 860. In other embodiments, the thickness T of the constant section portion 856 may be selected such that the paper strap 860 has any desired thickness T.

As best illustrated in FIG. 10, the entrance aperture 852 is configured to receive therethrough a number of twisted or non-twisted strings 801, according to the various embodiments described herein (e.g., 1, 101, 201, 301, 401, 501, 601, 701). As the twisted or non-twisted strings 801 are directed and/or pulled through the tapered section portion 855 of the recess 851, the twisted or non-twisted strings 801 are gradually compacted and/or consolidated in the lateral direction. The twisted or non-twisted strings 801 thereafter pass through the constant section portion 856, where the twisted or non-twisted strings 801 continue to be compacted and/or consolidated in the lateral direction, thus coupling the twisted or non-twisted strings 801 to each other to form the paper strap 860 having the selected width W. Further, compacting and/or consolidating the twisted or non-twisted strings 801 in this manner facilitate reduction of gaps between each of the twisted or non-twisted strings 801. Forming a paper strap 860 with reduced or narrow gaps between the twisted or non-twisted strings 801 advantageously improves the ultimate tensile strength properties of the paper strap 860.

In some embodiments, the pultrusion strap die 810 may be maintained at room temperature. Maintaining the pultrusion strap die 810 at room temperature may facilitate maintaining any adhesive coated on or applied to the non-twisted strings 801 in a liquid phase. As discussed above, in some embodiments, the non-twisted strings 801 may be impregnated and/or coated with a water-soluble adhesive, such as a water-soluble PVOH that may contain a water retention agent, such as sodium carboxymethyl cellulose, and may or shall contain a water soluble flexibilizer such as a polypropylene glycol (e.g.: molecular weight=2000). In such instances, for example, the strap formation device 810 may remain at room temperature to facilitate any residual water-soluble adhesive remaining in the liquid phase. In some embodiments, the pultrusion strap die 810 may be heated to a selected temperature. For example, the pultrusion strap die 810 may include an electrical heating system, such as coils or the like to heat the non-twisted strings 801 as they pass through the recess. In some embodiments, the pultrusion strap die 810 may include other systems and methods to heat the twisted or non-twisted strings 801, such as heaters, lamps, or the like.

Further, in some embodiments, the pultrusion strap die 810 may be heated to a temperature within a range of about 50-90° C. More generally, the pultrusion strap die 810 may be heated to suitable temperatures which may minimize frictional forces in the pultrusion strap die 810, as the coated or uncoated twisted or non-twisted strings 801 pass through the recess 851 of the pultrusion strap die 810. Still further, heating the pultrusion strap die 810 may also advantageously facilitate drying of the non-twisted strings 801 as they are compacted and/or consolidated to form the paper strap 860.

Figure 11:
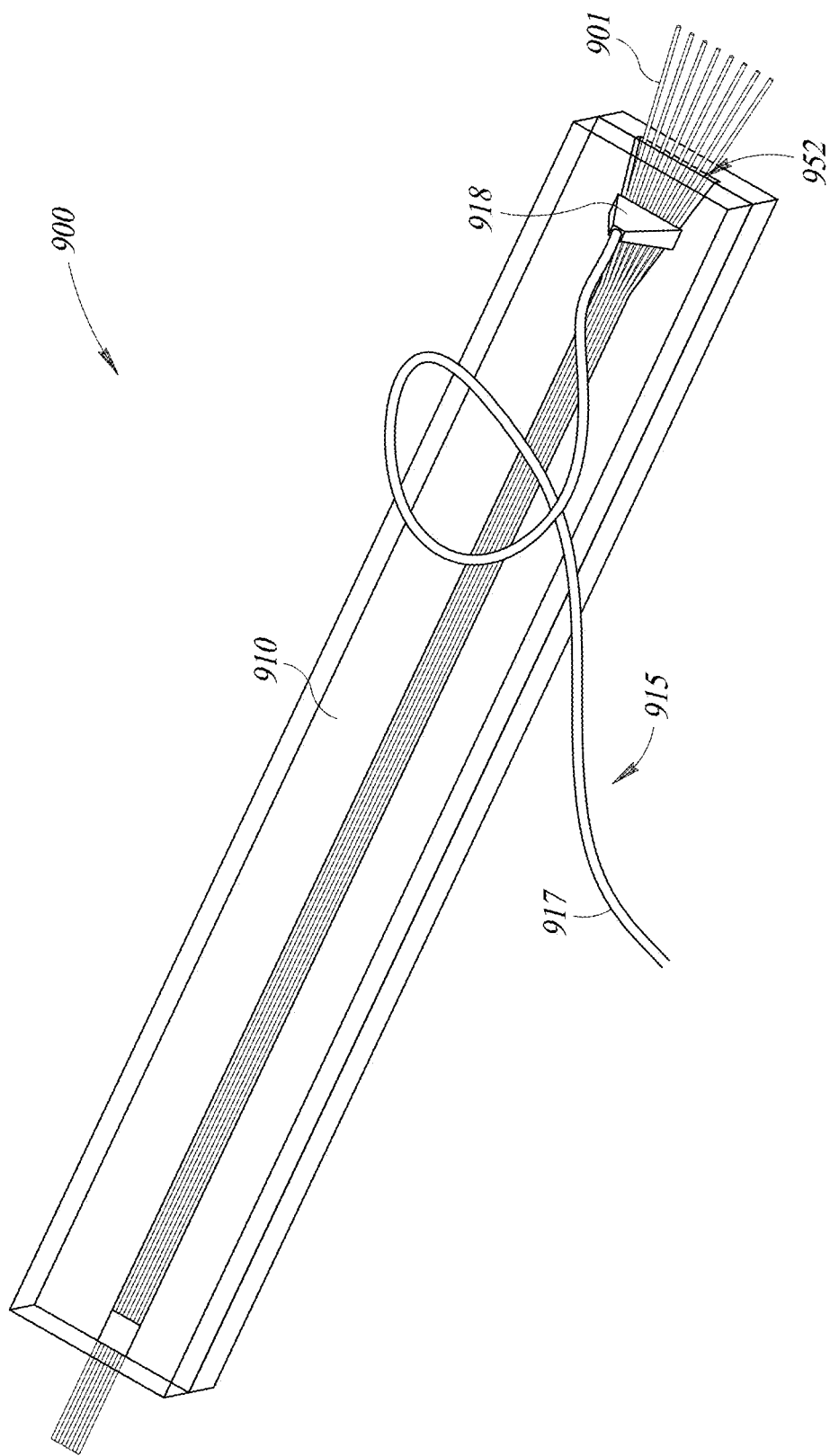
FIG. 11 is a perspective view of an apparatus for injecting a water soluble adhesive into the pultrusion strap die.

FIG. 11 illustrates an apparatus 900 for injecting an adhesive, such as a water-soluble adhesive, e.g., a water-soluble PVOH adhesive that may contain a water retention agent such as sodium-carboxymethyl cellulose and may or shall contain a water soluble flexibilizer such as a polypropylene glycol (e.g., molecular weight=2000), to twisted or non-twisted strings 901. The apparatus 900 includes a pultrusion strap die 910 and an injection device 915. The injection device 915 may include one or more conduits 917 which are in fluid communication with a vessel (not shown) or other supply of the water-soluble adhesive. The injection device 915 may include an injection head 918 coupled to the one or more conduits 917. As illustrated in FIG. 11, the injection head 918 is positioned proximal to an entry aperture 952 of the pultrusion strap die 910. In particular, the injection device 915 is configured to spray, inject, or apply the water-soluble adhesive as the twisted or non-twisted strings 901 enter the pultrusion strap die 910. In some embodiments, the apparatus 900 may include an impregnation system (e.g., 560) positioned adjacent to the pultrusion strap die 910.

In such an embodiment, the twisted or non-twisted strings 901 may be impregnated with a water-soluble adhesive, e.g., a water-soluble PVOH adhesive that may contain a water retention agent such as sodium-carboxymethyl cellulose and may or shall contain a water soluble flexibilizer such as a polypropylene glycol (e.g.: molecular weight=2000), prior to entering the pultrusion strap die 910.

Figure 12:
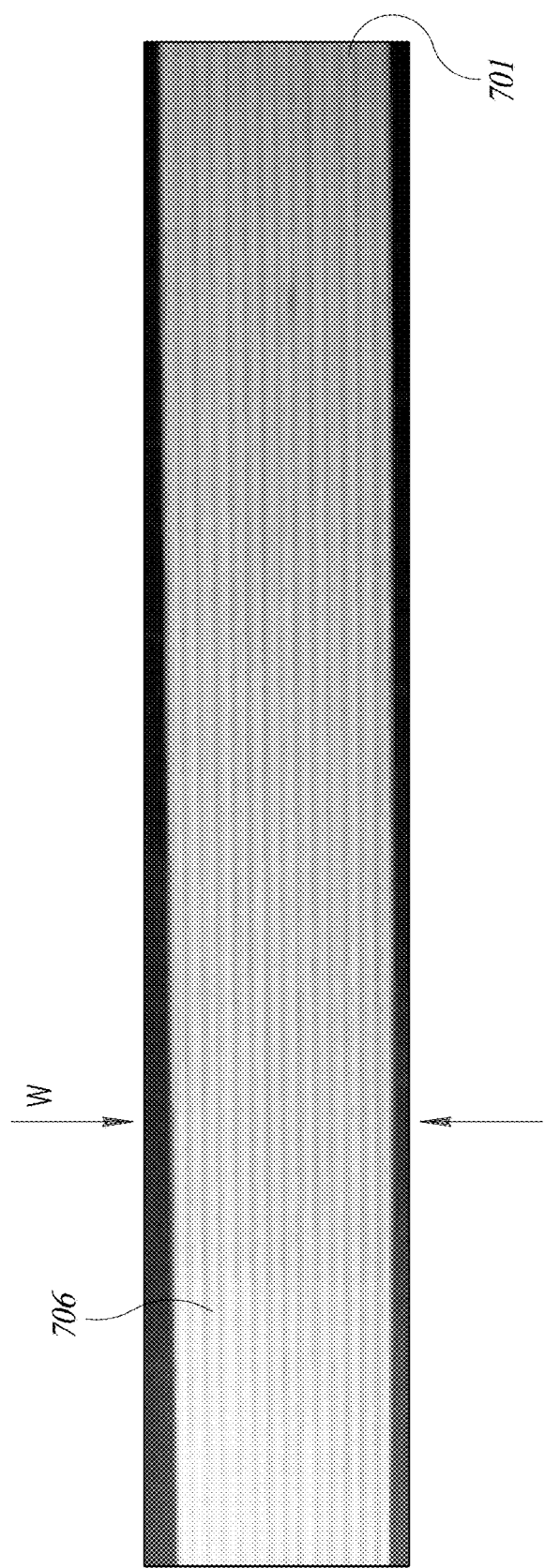
FIG. 12 is a top plan view of a paper strap, according to one embodiment.

FIG. 12 illustrates a paper strap 706 formed according to the embodiments of the apparatuses, methods, and devices described herein. The paper strap 706 was formed by directing fourteen non-twisted strings 701 through an embodiment of a pultrusion strap die (e.g., pultrusion strap die 810, 910), having a recess (e.g., recess 851) with a constant section portion (e.g., constant section portion 856) having a thickness T (not shown) of about 1.2 mm and a width W of about 17 mm. The non-twisted strings 701 were coated with an injection of a water-soluble PVOH adhesive that may contain a water retention agent such as sodium-carboxymethyl cellulose all while pultruded through the pultrusion strap die (e.g., pultrusion strap die 810, 910). The final strap had a coat of 12% w/w PVOH adhesive content. Subsequent tensile strength tests showed a marked improvement in ultimate tensile strength properties, in comparison with commercially available conventional paper strap formed from twisted strings (see, e.g., FIG. 17).

Figure 13:
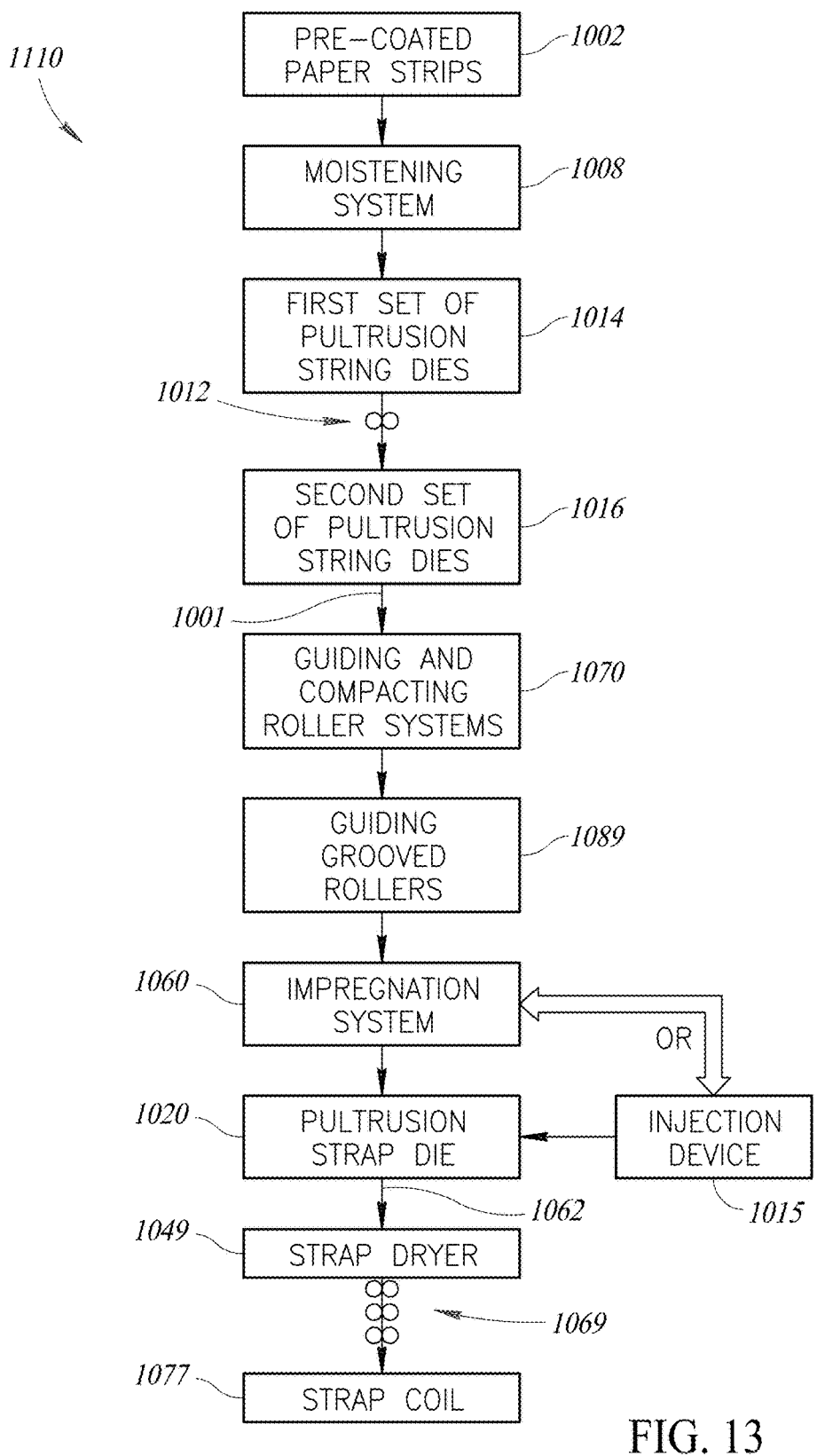
FIG. 13 is a schematic block diagram of a strap pultrusion machine, according to one embodiment.

FIG. 13 is a schematic block diagram of a strap pultrusion machine 1110, according to one embodiment. The strap pultrusion machine 1110 may include one or more rotatable reels (not shown) about which a base paper is wound. The wound base paper can form a roll (e.g., a tightly wound roll) that can be unwound as the base paper is pulled from the one or more rotating reels. In the embodiment illustrated in FIG. 13, the base paper wound about one or more rotatable reels is pre-coated with a water soluble adhesive, such as PVOH that may or shall contain a water soluble flexibilizer such as a polypropylene glycol (e.g.: molecular weight=2000), to provide a plurality of pre-coated paper strips 1002. The strap pultrusion machine 1110 includes a first driver system 1012 including a motor operably coupled to a set of pinch rollers. The first driver system 1012 is configured to pull the paper strips 1002 through a moistening system 1008 and dies 1014 such as for example, pultrusion string dies (e.g., funneling dies 5, 105, 205, 305, 405, 505 and nozzle dies 22, 122*a*, 122*b*, 122*c*, etc.). In particular, the paper strips 1002 are directed and/or pulled through the moistening system 1008, such as, for example, moistening system 208, which may activate the surface tackiness of the adhesive through heat or liquid application. As discussed above, the moistening system 1008 may include misting nozzles, a bath of water fog, a steam chamber, or other systems that apply liquids, such as water, to the paper strips 1002 to activate the surface tackiness of the water-soluble adhesive.

After passing through the moistening system 1008, the paper strips 1002 are thereafter directed and/or pulled through a first set of pultrusion string dies 1014.

As discussed above, in some embodiments, each of the number of paper strips 1002 may first be pulled and/or directed through a corresponding number of pultrusion string dies, such as the funneling dies (e.g., funneling dies 5, 105, 205, 305, etc.) to form intermediate strings. The intermediate strings may thereafter be pulled and/or directed through a number of pultrusion string dies, such as the nozzle dies (e.g., nozzle dies 22, 122*a*, 122*b*, 122*c*, etc.) positioned adjacent to one another. Each of the number of nozzle dies (e.g., nozzle dies 22, 122*a*, 122*b*, 122*c*, etc.) may include a receptacle (e.g., receptacle 9, 109, etc.) to receive and compact the respective intermediate strings and the non-twisted strings 1001. In some embodiments, the paper strips 1002 may be directed from the funneling dies, formed into intermediate strings, to a corresponding number of nozzle dies (e.g., nozzle dies 22, 122*a*, 122*b*, 122*c*, etc.). The intermediate strings are directed and/or pulled through the first set of pultrusion string dies 1014 to form non-twisted strings 1001.

In some embodiments, including the embodiment illustrated in FIG. 13, one or more of a number of the first set of pultrusion string dies 1014 may include an electrical heating system, such as coils or the like. In some embodiments, one or more of a number of the first set of pultrusion string dies 1014 may include a heater, lamp, or other suitable device to heat and dry the non-twisted strings 1001.

After passing through the first set of pultrusion string dies 1014, the second driver system 1069 may direct and/or pull the non-twisted strings 1001 through the second set of pultrusion string dies 1016.

Again, as discussed above, in some embodiments, each of the number of non-twisted strings 1001 may optionally first be pulled and/or directed through a corresponding number of pultrusion string dies, such as the funneling dies (e.g., funneling dies 5, 105, 305, etc.). The non-twisted strings 1001 may thereafter be pulled and/or directed through a number of pultrusion string dies, such as nozzle dies (e.g., nozzle dies 22, 122*a*, 122*b*, 122*c*, etc.) positioned adjacent to one another. Each of the number of pultrusion string dies (e.g., nozzle dies 22, 122*a*, 122*b*, 122*c*, etc.) may include a receptacle (e.g., receptacle 9, 109, etc.) to receive and compact the respective non-twisted strings 1001. In some embodiments, the non-twisted strings 1001 may be directed from the optional funneling dies to a corresponding number of pultrusion string dies (e.g., nozzle dies 22, 122*a*, 122*b*, 122*c*, etc.). Although in the embodiment of the strap pultrusion machine 1110 illustrated in FIG. 13, the second set of pultrusion string dies 1016 do not include means to heat the non-twisted strings 1001, in other embodiments, one of a number of the second set of dies 1016 may include means to heat the non-twisted strings 1001.

The strap pultrusion machine 1110 includes one or more guiding and compacting roller systems 1070 similar to, for example, guiding and compacting roller systems 670, and one or more guiding grooved rollers 1089, similar to guiding grooved rollers 689, for example. In some embodiments, each of the non-twisted strings 1001 may be directed to a same one of the one or more guiding and compacting roller systems 1070 and/or guiding grooved rollers 1089. In other embodiments, each of the non-twisted strings 1001 may be directed to a corresponding one of the one or more guiding and compacting roller systems 1070 and/or guiding grooved rollers 1089. As discussed above, the guiding and compacting roller systems 1070 and/or guiding grooved rollers 1089 may facilitate further compacting and/or consolidating the non-twisted strings 1001 and guide the non-twisted strings 1001 to an impregnation system 1060, similar to the impregnation system 560, for example.

The impregnation system 1060 may include a vessel (e.g., vessel 562) and a roller (e.g., roller 564). The vessel (e.g., vessel 562) may include a liquid to coat and/or impregnate the non-twisted strings 1001, such as a water-soluble PVOH adhesive that may contain a water retention agent, such as sodium-carboxymethyl cellulose, and may or shall contain a water soluble flexibilizer such as a polypropylene glycol (e.g.: molecular weight=2000), or any other suitable water-soluble adhesive. As the roller (e.g., roller 564) rotates, the non-twisted strings 1001 are pulled against a top surface of the PVOH wetted-roller (e.g., roller 564) to impregnate or coat the non-twisted strings 1001 with a water-soluble PVOH adhesive that may contain a water retention agent such as sodium-carboxymethyl cellulose, and may or shall contain a water soluble flexibilizer such as a polypropylene glycol (e.g.: molecular weight=2000). For example, one recipe for the coating liquid is composed of 24% w/w PVOH and 2% sodium-carboxymethyl cellulose in deionized water. A second recipe for the coating liquid is composed of 19% w/w PVOH and 19% w/w polypropylene glycol (molecular weight=2000).

The strap pultrusion machine 1110 also includes a pultrusion strap die 1020, such as the pultrusion strap die 810, 910, for example. Each of the non-twisted strings 1001 are pulled and/or directed to the pultrusion strap die 1020. As discussed above, the pultrusion strap die 1020 may compact and couple the non-twisted strings 1001 into a paper strap 1062, such as paper strap 860, for example. In some embodiments, including the embodiment illustrated in FIG. 13, the pultrusion strap die 1020 may include means to heat the PVOH, the water-soluble PVOH adhesive that may contain a water retention agent, such as sodium-carboxymethyl cellulose, and may or shall contain a water soluble flexibilizer such as a polypropylene glycol (e.g.: molecular weight=2000), and the non-twisted strings 1001, for example, via an electrical heating system, such as coils, heaters, lamps, or the like.

In some embodiments, the strap pultrusion machine 1110 may optionally and/or additionally include an injection device 1015, similar to injection device 915, for example. As discussed above, the injection device 1015 may include one or more conduits (e.g., conduits 917) which are in fluid communication with a vessel containing a water-soluble adhesive, such as a water-soluble PVOH adhesive that may contain a water retention agent such as sodium carboxymethyl cellulose, and may or shall contain a water soluble flexibilizer such as a polypropylene glycol (e.g.: molecular weight=2000), or any other suitable water-soluble adhesive. The injection device 1015 may include an injection head (e.g., injection head 918) connected to the one or more conduits (e.g., conduits 917), which are configured to spray, inject, or apply the water-soluble adhesive as the non-twisted strings 1001 enter the pultrusion strap die 1020 such as a tapered section of the pultrusion strap die 1020. Alternatively, the strap pultrusion machine 1110 may include an impregnation system (e.g., impregnation system 560) positioned adjacent to the pultrusion strap die 1020.

The strap pultrusion machine 1110 further includes a strap dryer 1049. The strap dryer 1049 may be configured to supply air flow at room temperature to facilitate drying of the paper strap 1062. In some embodiments, the strap dryer 1049 may be configured to supply air flow at higher temperatures to accelerate drying of the paper strap 1062 at increased temperatures. In some embodiments, the strap pultrusion machine 1110 may optionally, additionally, or alternatively include other drying systems, such as heated rolls, lamps, or the like. As illustrated in FIG. 13, the strap pultrusion machine 1020 includes a further plurality of driver systems 1069 having motors operably coupled to pinch rollers. The driver systems 1069 are positioned adjacent to the strap dryer 1049. The plurality of driver systems 1069 individually or in combination with the first driver system 1012 are configured to pull, drive, direct, and/or guide the paper strips 1002, the intermediate strings, the non-twisted strings 1001, and/or the paper strap 1062. After the paper strap 1062 is passed through the strap dryer 1049, the paper strap 1062 is wound on a reel to form a strap coil 1077 or a roll.

Figure 14:
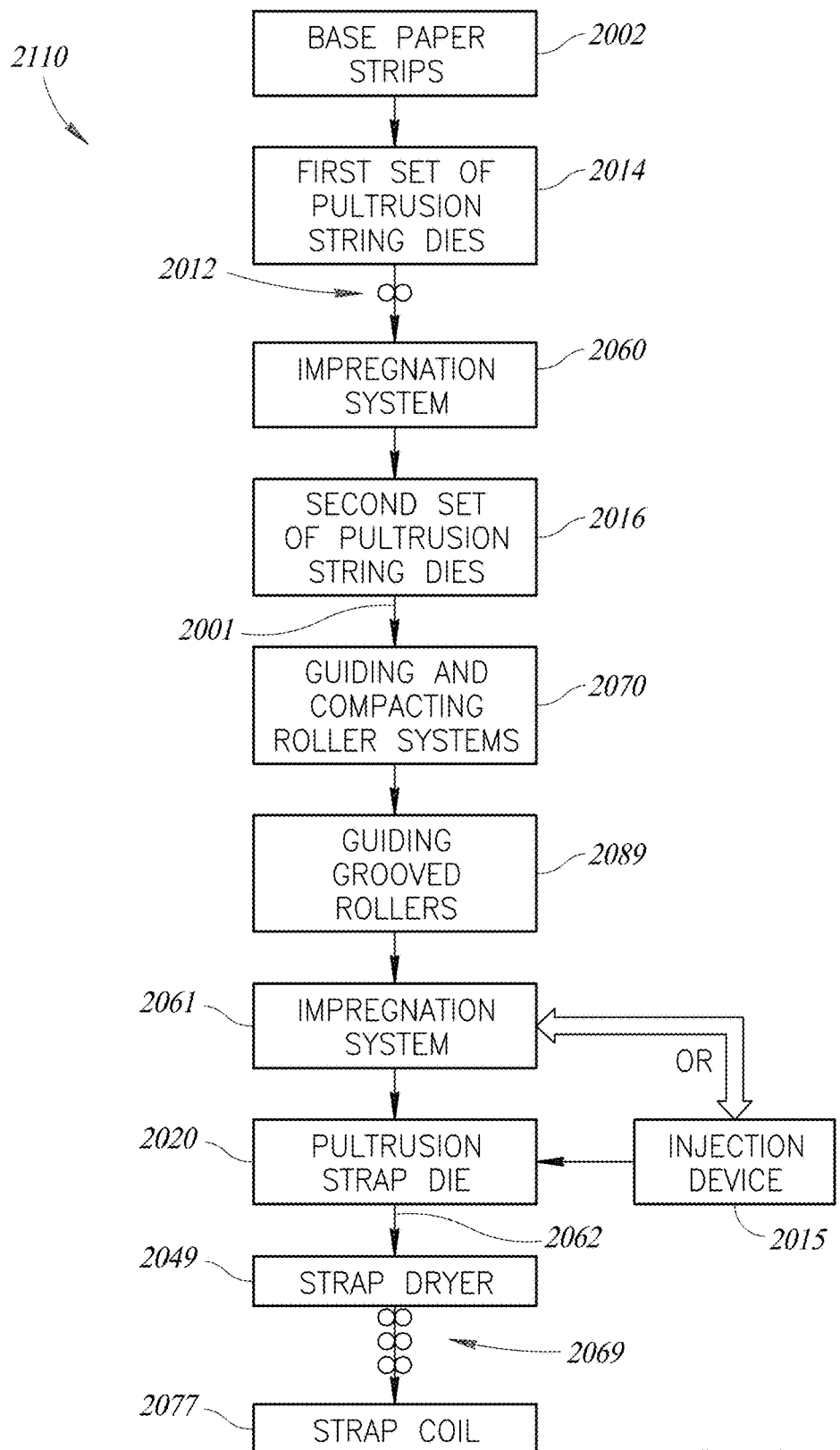
FIG. 14 is a schematic block diagram of a strap pultrusion machine, according to one embodiment.

FIG. 14 is a schematic block diagram of a strap pultrusion machine 2110, according to another embodiment. The strap pultrusion machine 2110 may include one or more rotatable reels (not shown) about which a base paper is wound. The wound base paper can form a roll (e.g., a tightly wound roll) that can be unwound as the base paper is pulled from the one or more rotating reels to provide a plurality of paper strips. The embodiment illustrated in FIG. 14 provides a variation in which the base paper wound about one or more rotatable reels is not pre-coated with an adhesive, and is configured to provide uncoated paper strips 2002.

The strap pultrusion machine 2110 includes a first driver system 2012 including a motor operably coupled to a set of pinch rollers. The first driver system 2012 is configured to direct and/or pull the paper strips 2002 through a first set of pultrusion string dies 1014. As discussed above, in some embodiments, each of the number of paper strips 2002 may first be pulled and/or directed through a corresponding number of pultrusion string dies, such as funneling dies (e.g., funneling dies 5, 105, 305, etc.) to form intermediate strings. The intermediate strings may thereafter be pulled and/or directed through a number of pultrusion string dies, such as nozzle dies (e.g., nozzle dies 22, 122a, 122b, 122c, etc.) positioned adjacent to one another. Each of the number of pultrusion string dies, such as nozzle dies (e.g., nozzle dies 22, 122a, 122b, 122c, etc.) may include a receptacle (e.g., receptacle 9, 109, etc.) to receive and compact the respective intermediate strings and the non-twisted strings 2001. In some embodiments, the paper strips 2002 may be directed from the funneling dies, formed into intermediate strings, to a corresponding number of pultrusion string dies, such as nozzle dies (e.g., nozzle dies 22, 122a, 122b, 122c, etc.). The intermediate strings are directed and/or pulled through the first set of pultrusion string die 2014 to form non-twisted strings 2001.

The strap pultrusion machine 2110 includes a first impregnation system 2060, which may include a vessel (e.g., vessel 562) and a roller (e.g., roller 564). The vessel (e.g., vessel 562) may include a liquid to coat and/or impregnate the non-twisted strings 2001, such as a water-soluble PVOH adhesive-that may contain a water retention agent, such as sodium-carboxymethyl cellulose, and may or shall contain a water soluble flexibilizer such as a polypropylene glycol (e.g.: molecular weight=2000), or any other suitable water-soluble adhesive. As the roller (e.g., roller 564) rotates, the non-twisted strings 2001 are pulled against a top surface of the PVOH wetted-roller (e.g., roller 564) to impregnate or coat the non-twisted strings 2001 with a water-soluble PVOH adhesive that may contain a water retention agent such as sodium-carboxymethyl cellulose, and may or shall contain a water soluble flexibilizer such as a polypropylene glycol (e.g.: molecular weight=2000). After passing through the first impregnation system 2060, the non-twisted strings 2001 may be directed and/or pulled through a second set of pultrusion string dies 2016.

Again, as discussed above, in some embodiments, each of the number of non-twisted strings 2001 may optionally first be pulled and/or directed through a corresponding number of pultrusion string dies, such as funneling dies (e.g., funneling dies 5, 105, 305, etc.). The non-twisted strings 2001 may thereafter be pulled and/or directed through a number of pultrusion string dies, such as nozzle dies (e.g., nozzle dies 22, 122a, 122b, 122c, etc.) positioned adjacent to one another. Each of the number of pultrusion string dies, such as nozzle dies (e.g., nozzle dies 22, 122a, 122b, 122c, etc.) may include a receptacle (e.g., receptacle 9, 109, etc.) to receive and compact the respective non-twisted strings 2001. In some embodiments, the non-twisted strings 2001 may be directed from the optional funneling dies to a corresponding number of pultrusion string dies, such as nozzle dies (e.g., nozzle dies 22, 122a, 122b, 122c, etc.). In some embodiments, including the embodiment illustrated in FIG. 14, one or more of a number of the second set of pultrusion string dies 2016 may include means to heat the non-twisted strings 2001, for example, an electrical heating system, such as coils, or the like. In some embodiments, one or more of a number of the second set of dies 2016 may include a heater, lamp, or other suitable device to heat the paper non-twisted strings 2001.

The strap pultrusion machine 2110 includes one or more guiding and compacting roller systems 2070, similar to, for example, guiding and compacting roller systems 670, and one or more guiding grooved rollers 2089, similar to guiding grooved rollers 689, for example. In some embodiments, each of the non-twisted strings 2001 may be directed to a same one of the one or more guiding and compacting roller systems 2070 and/or guiding grooved rollers 2089. In other embodiments, each of the non-twisted strings 2001 may be directed to a corresponding one of the one or more guiding and compacting roller systems 2070 and/or guiding grooved rollers 2089. As discussed above, the guiding and compacting roller systems 2070 and/or guiding grooved rollers 2089 may facilitate further compacting and/or consolidating the non-twisted strings 2001 and guide the non-twisted strings 2001 to a second impregnation system 2061, such as the impregnation system 560, for example.

The second impregnation system 2061 may include a vessel (e.g., vessel 562) and a roller (e.g., roller 564). The vessel (e.g., vessel 562) may include a liquid to coat and/or impregnate the non-twisted strings 2001, such as a water-soluble PVOH adhesive that may contain a water retention agent, such as sodium-carboxymethyl cellulose, and may or shall contain a water soluble flexibilizer such as a polypropylene glycol (e.g.: molecular weight=2000), or any other suitable water-soluble adhesive. As the roller (e.g., roller 564) rotates, the non-twisted strings 2001 may be pulled against a top surface of the PVOH wetted-roller (e.g., 564) to impregnate or coat the non-twisted strings 2001 with a water-soluble PVOH adhesive that may contain a water retention agent such as sodium-carboxymethyl cellulose, and may or shall contain a water soluble flexibilizer such as a polypropylene glycol (e.g.: molecular weight=2000).

The strap pultrusion machine 2110 also includes a pultrusion strap die 2020, similar to the pultrusion strap dies 810, 910, for example. Each of the non-twisted strings 2001 are pulled and/or directed to the pultrusion strap die 2020. As discussed above, the pultrusion strap die 2020 may compact and couple the non-twisted strings 2001 into a paper strap 2062, such as paper strap 860, for example. In some embodiments, including the embodiment illustrated in FIG. 14, the pultrusion strap die 2020 may include means to heat the PVOH and the non-twisted strings 2001, for example, via an electrical heating system, such as coils, heaters, lamps, or the like.

In some embodiments, the strap pultrusion machine 2110 may optionally and/or additionally include an injection device 2015, similar to injection device 915, for example. As discussed above, the injection device 2015 may include one or more conduits (e.g., conduits 917) which are in fluid communication with a vessel containing a water-soluble adhesive, such as a water-soluble PVOH adhesive that may contain a water retention agent such as sodium-carboxymethyl cellulose, and may or shall contain a water soluble flexibilizer such as a polypropylene glycol (e.g.: molecular weight=2000), or any other suitable water-soluble adhesive. The injection device 2015 may include an injection head (e.g., injection head 918) connected to the one or more conduits (e.g., conduits 917), which are configured to spray, inject, or apply the water-soluble adhesive as the non-twisted strings 2001 enter the pultrusion strap die 2020, such as a tapered section of the pultrusion strap die 2020. Alternatively, the strap pultrusion machine 2110 may include an impregnation system (e.g., impregnation system 560) positioned adjacent to the pultrusion strap die 2020.

The strap pultrusion machine 2110 further includes a strap dryer 2049. The strap dryer 2049 may be configured to supply air flow at room temperature to facilitate drying of the paper strap 2062. In some embodiments, the strap dryer 2049 may be configured to supply air flow at higher temperatures to accelerate drying of the paper strap 2062 at increased temperatures. In some embodiments, the strap pultrusion machine 2110 may optionally, additionally, or alternatively include other drying systems, such as heated rolls, lamps, or the like. As illustrated in FIG. 14, the pultrusion strap die 2020 includes a further plurality of driver systems 2069 having motors operably coupled to pinch rollers. The driver systems 2069 are positioned adjacent to the strap dryer 2049. The plurality of driver systems 2069, individually or in combination with the first driver system 2012, are configured to pull, drive, direct, and/or guide the paper strips 2002, the intermediate strings, the non-twisted strings 2001, and/or the paper strap 2062. After the paper strap 2062 is passed through the strap dryer 2049, the paper strap 2062 is directed and wound on a reel to form a strap coil 2077.

Figure 15:
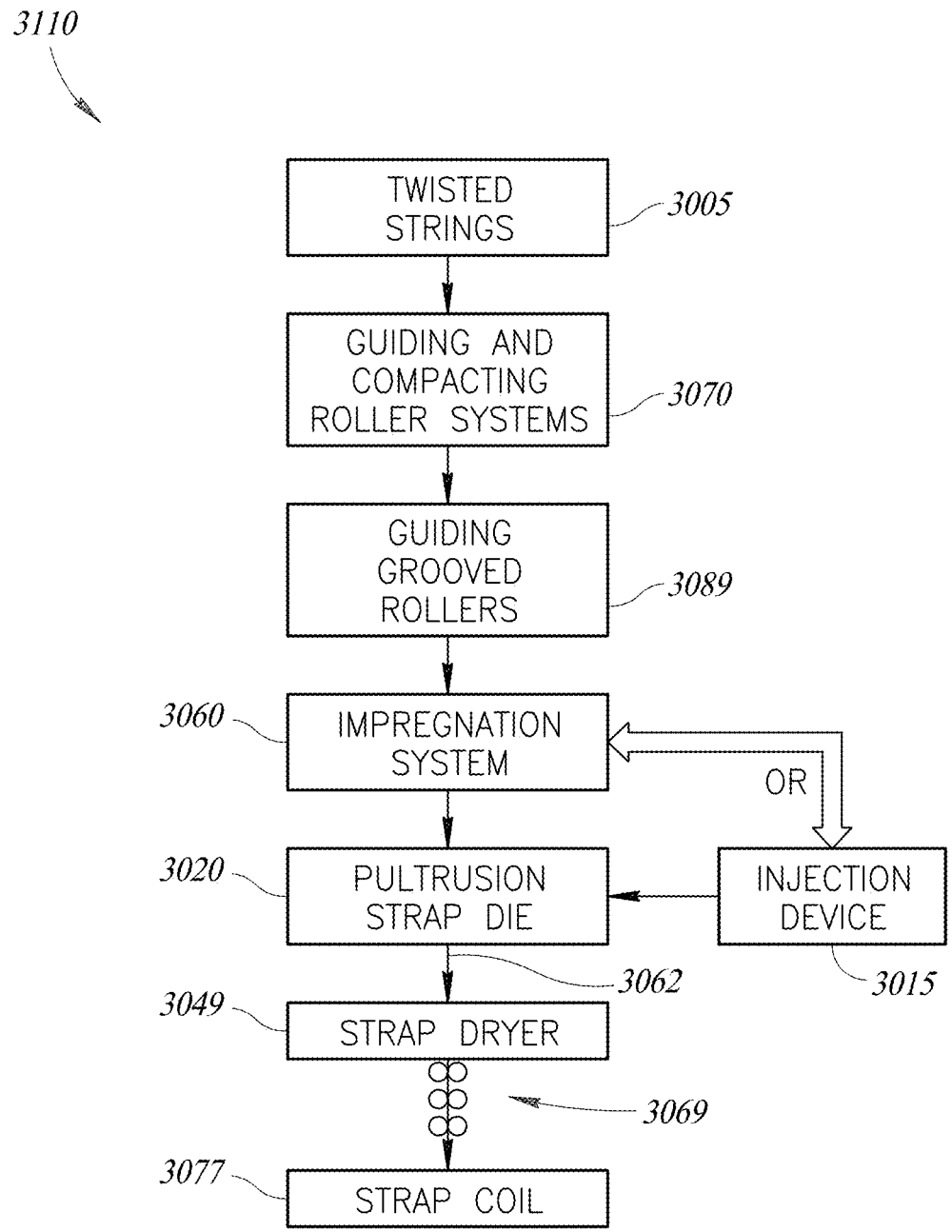
FIG. 15 is a schematic block diagram of a strap pultrusion machine, according to one embodiment.

FIG. 15 is a schematic block diagram of a strap pultrusion machine 3110, according to another embodiment. The strap pultrusion machine 3110 provides a variation in which a plurality of twisted strings 3005, e.g., twisted paper strips, may be provided through one or more rotatable reels (not shown).

The strap pultrusion machine 3110 includes one or more guiding and compacting roller systems 3070, similar to, for example, guiding and compacting roller systems 670, and one or more guiding grooved rollers 3089, similar to guiding grooved rollers 689, for example. In some embodiments, each of the twisted strings 3005 may be directed to a same one of the one or more guiding and compacting roller systems 3070 and/or guiding grooved rollers 3089. In other embodiments, each of the twisted strings 3005 may be directed to a corresponding one of the one or more guiding and compacting roller systems 3070 and/or guiding grooved rollers 3089. As discussed above, the compacting roller systems 3070 and/or guiding grooved rollers 3089 may facilitate further compacting and/or consolidating the twisted strings 3005 and guide the twisted strings 3005 to an impregnation system 3060, such as the impregnation system 560, for example.

The impregnation system 3060 may include a vessel (e.g., vessel 562) and a roller (e.g., roller 564). The vessel (e.g., vessel 562) may include a liquid to coat and/or impregnate the twisted strings 3005, such as a water-soluble PVOH adhesive that may contain a water retention agent such as sodium-carboxymethyl cellulose, and may or shall contain a water soluble flexibilizer such as a polypropylene glycol (e.g.: molecular weight=2000), or any other suitable water-soluble adhesive. As the roller (e.g., roller 564) rotates, the twisted strings 3005 are pulled against a top surface of the PVOH wetted-roller (e.g., roller 564) to impregnate or coat the twisted strings 3005 with a water-soluble PVOH adhesive that may contain a water retention agent such as sodium-carboxymethyl cellulose, and may or shall contain a water soluble flexibilizer such as a polypropylene glycol (e.g.: molecular weight=2000).

The strap pultrusion machine 3110 also includes a pultrusion strap die 3020, such as the pultrusion strap die 810, 910, for example. Each of the twisted strings 3005 are pulled and/or directed to the pultrusion strap die 3020. As discussed above, the pultrusion strap die 3110 may compact and couple the twisted strings 3005 into a paper strap 3062. In some embodiments, including the embodiment illustrated in FIG. 15, the pultrusion strap die 3010 may include means to heat the PVOH and twisted strings 3005, for example, via an electrical heating system, such as coils, leads, heaters, lamps, or the like.

In some embodiments, the strap pultrusion machine 3110 may optionally and/or additionally include an injection device 3015, similar to injection device 915, for example. As discussed above, the injection device 3015 may include one or more conduits (e.g., conduits 917) which are in fluid communication with a vessel containing a water-soluble adhesive, such as a water-soluble PVOH adhesive that may contain a water retention agent such as sodium-carboxymethyl cellulose, and may or shall contain a water soluble flexibilizer such as a polypropylene glycol (e.g.: molecular weight=2000), or any other suitable water-soluble adhesive. The injection device 3015 may include an injection head (e.g., injection head 918) connected to the one or more conduits (e.g., conduits 917), which are configured to spray, inject, or apply the water-soluble adhesive as the twisted strings 3005 enter the pultrusion strap die 3020. Alternatively, the strap pultrusion machine 3110 may include an impregnation system (e.g., impregnation system 560) positioned adjacent to the pultrusion strap die 3020.

The strap pultrusion machine 3110 further includes a strap dryer 3049. The strap dryer 3049 may be configured to supply air flow at room temperature to facilitate drying of the paper strap 3062. In some embodiments, the strap dryer 3049 may be configured to supply air flow at higher temperatures to accelerate drying of the paper strap 3062 at increased temperatures. In some embodiments, the strap pultrusion machine 3110 may optionally, additionally, or alternatively include other drying systems, such as heated rolls, lamps, or the like. As illustrated in FIG. 15, the strap pultrusion machine 3110 includes a plurality of driver systems 3069 having motors operably coupled to pinch rollers. The driver systems 3069 are positioned adjacent to the strap dryer 3049. The plurality of driver systems 3069 individually or in combination are configured to pull, drive, direct, and/or guide the twisted strings 3005 and/or the paper strap 3062. After the paper strap 3062 is passed through the strap dryer 3049, the paper strap 3062 is wound on a reel to form a strap coil 3077.

Figure 16:
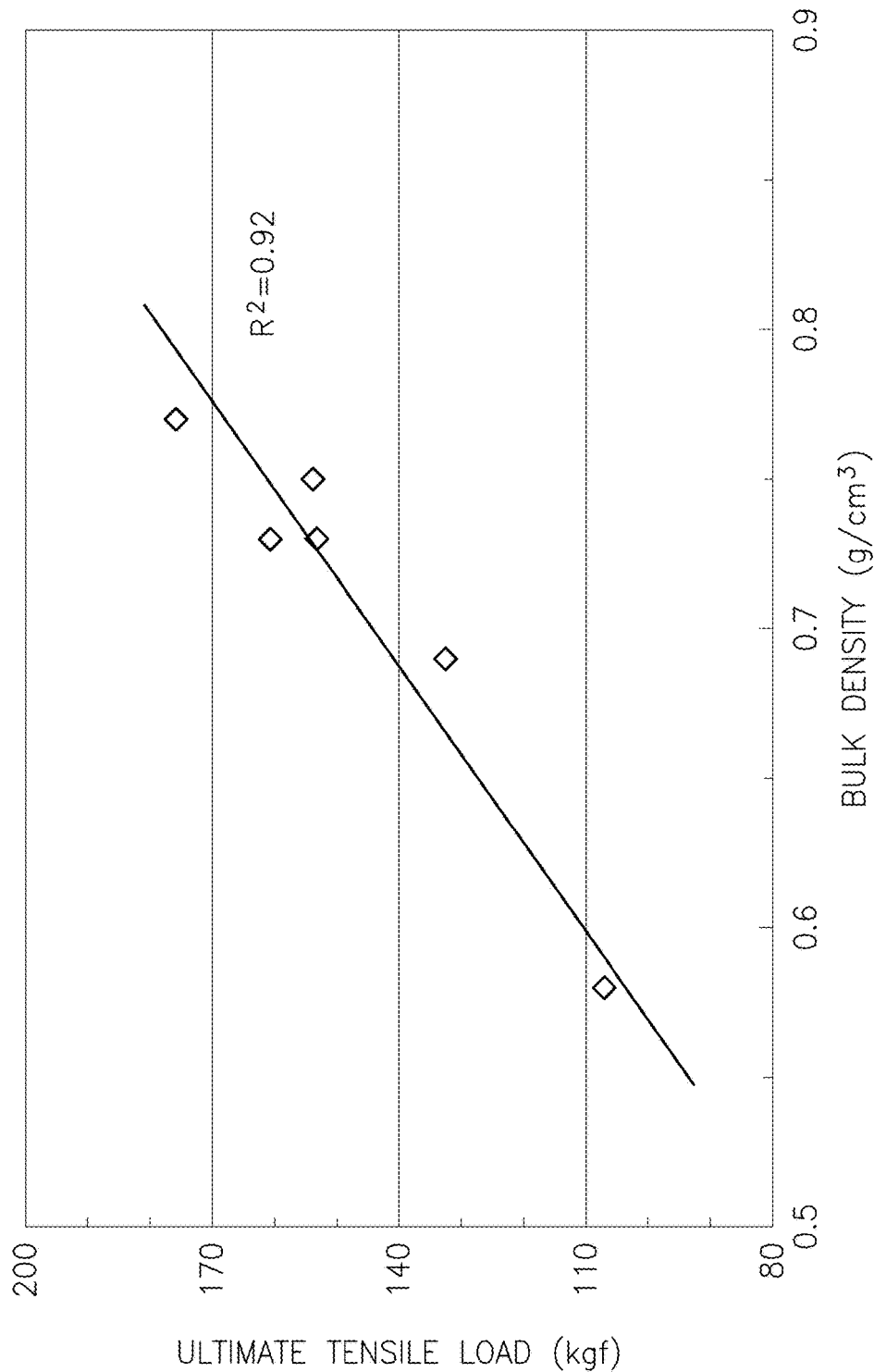
FIG. 16 is a graph illustrating relationship of ultimate tensile strengths of benchmarked commercially-made paper straps according to embodiments of the disclosed subject matter.

As discussed in more detail above, the various embodiments of the paper straps (e.g., paper straps 502, 860, 1062, 2062, 3062) are advantageously formed to have reduced gaps between the paper strips (e.g., paper strips, 1, 101, 201, 301, 401, etc.). The inventors have discovered through various experimental procedures that a linear relationship can be established between the ultimate tensile strength of the paper strap and a bulk density of the paper strap. The bulk density may be correlated to the number of paper strips in the strap and gaps therebetween, or more specifically, a ratio of strap linear weight over the cross-section of the paper strap. FIG. 16 is a graph with a vertical axis corresponding to the ultimate tensile load of the paper strap and a horizontal axis corresponding to the bulk density of the paper strap. As illustrated in FIG. 16, a higher bulk density results in improved ultimate tensile strengths of the commercially-made paper straps.

Figure 17:
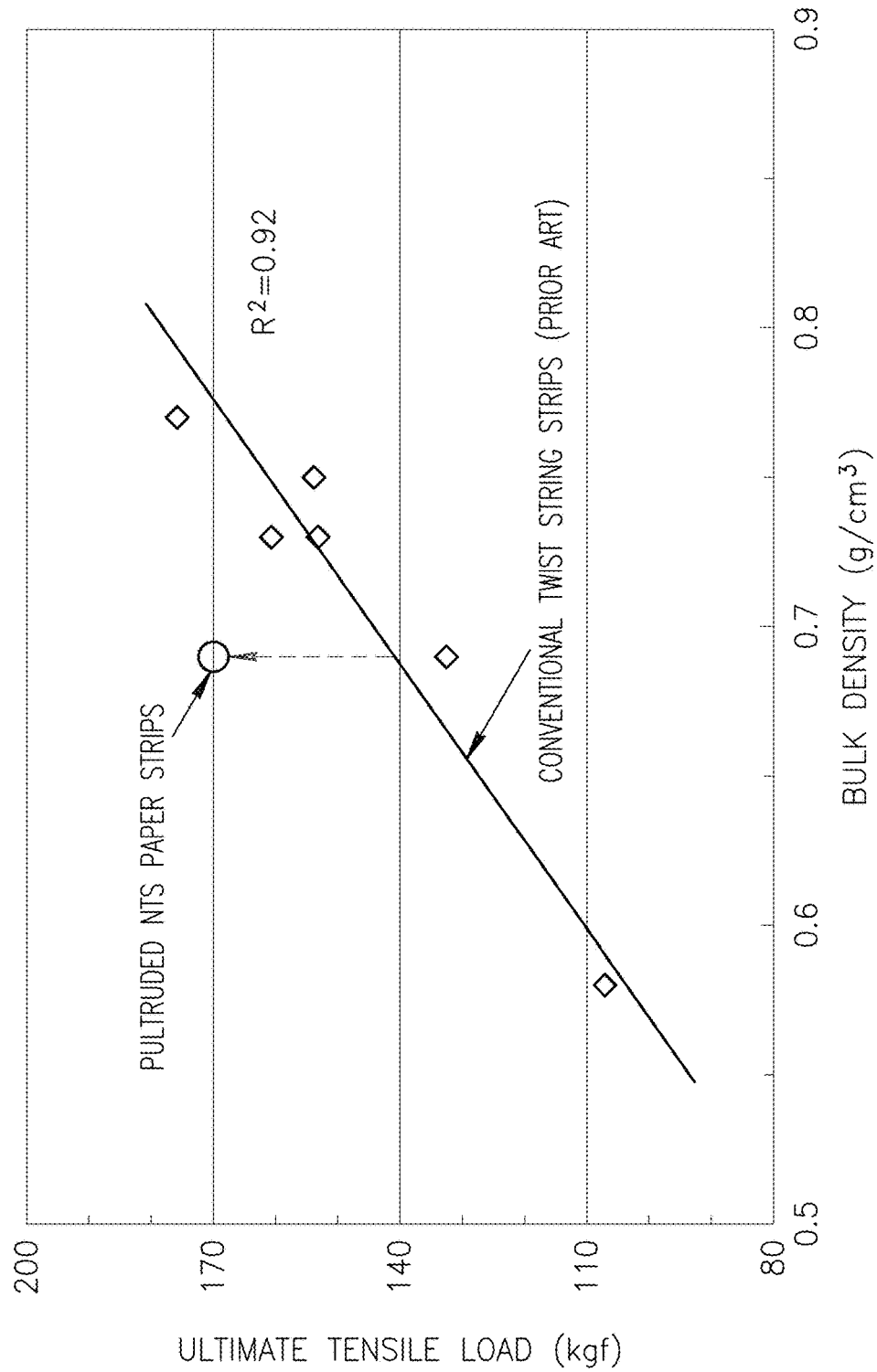
FIG. 17 is a graph illustrating ultimate tensile strengths of paper straps according to embodiments of the disclosed subject matter.

FIG. 17 is a graph with a horizontal axis corresponding to the bulk density of the paper strap and a vertical axis corresponding to the ultimate tensile load. In particular, FIG. 17 illustrates experimental testing results, comparing the paper strap formed from non-twisted strings (NTS) according to the various embodiments described herein and conventional paper straps formed from twisted paper strings. As shown in FIG. 17, the paper straps formed according to the various embodiments described herein result in significant improvements in ultimate tensile strengths of the paper straps.

Figure 18:
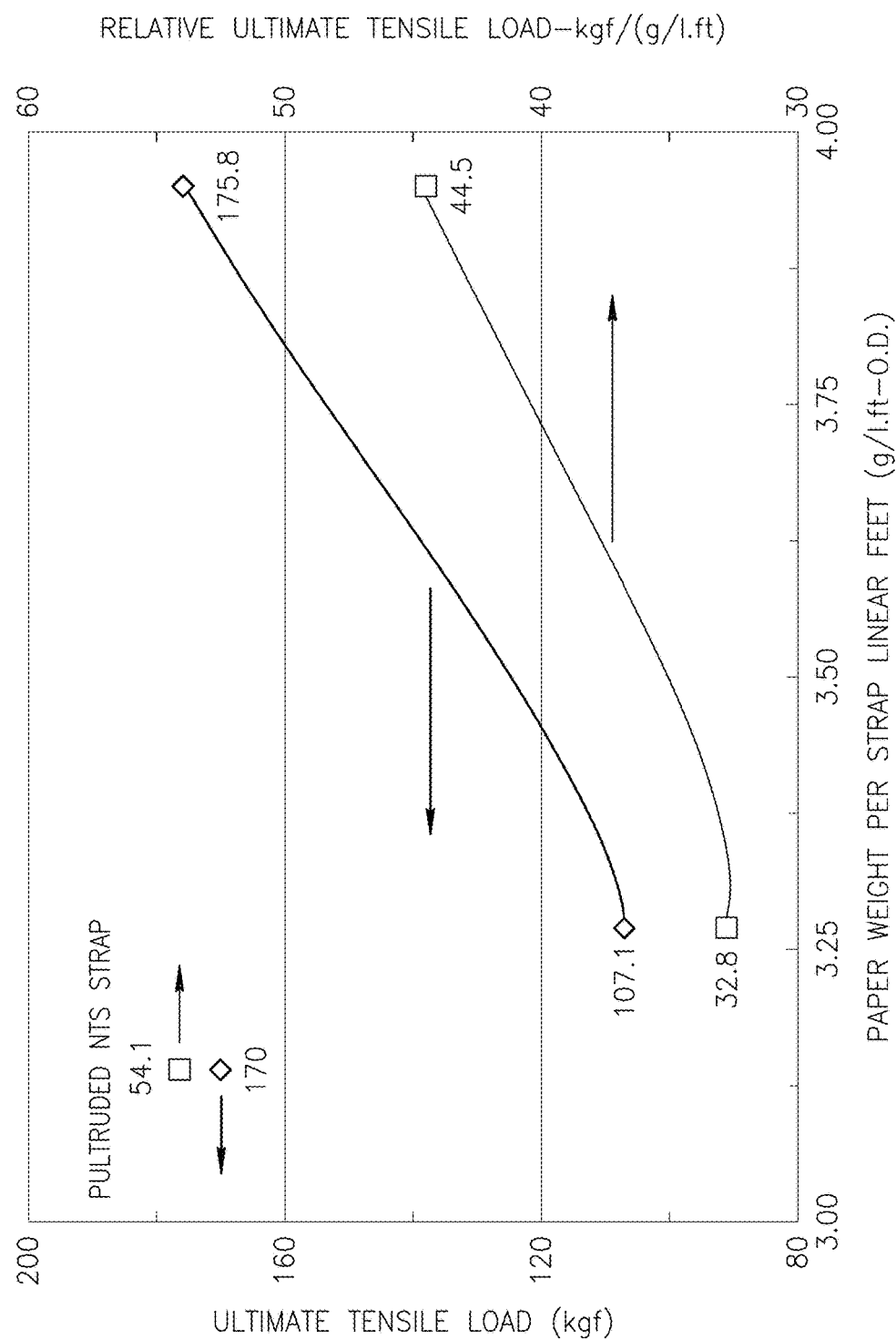
FIG. 18 is a graph illustrating ultimate tensile strengths of paper straps according to embodiments of the disclosed subject matter.

FIG. 18 is a graph with a horizontal axis corresponding to paper weight per strap linear feet and a left vertical axis corresponding to the ultimate tensile load and a right vertical axis corresponding to the relative ultimate tensile load. In particular, FIG. 18 illustrates experimental testing results, comparing the paper weight per linear feet of paper strap and the ultimate tensile strengths of paper strap formed from pultruded non-twisted strings (NTS) according to the various embodiments described herein and the conventional paper straps formed from twisted paper strings. As shown in FIG. 18, the paper straps according to the various embodiments described herein can provide substantial cost effective tensile strength improvements over conventional paper strips, such as, for example, 54.1 kgf per gram per linear feet, in comparison to 44.5 kgf per gram per linear feet.

Moreover, in addition to, or in lieu of, the various methods, devices, and apparatuses described herein, the ultimate tensile strengths of the paper straps may be also improved, in some embodiments, by reinforcement of the base paper that forms the paper straps. For example, in some embodiments, the base paper may be reinforced by pulp refining prior to papermaking, such as mechanical refining (e.g., beating), chemical dry and/or wet strength additives, or the like.

Figure 19:
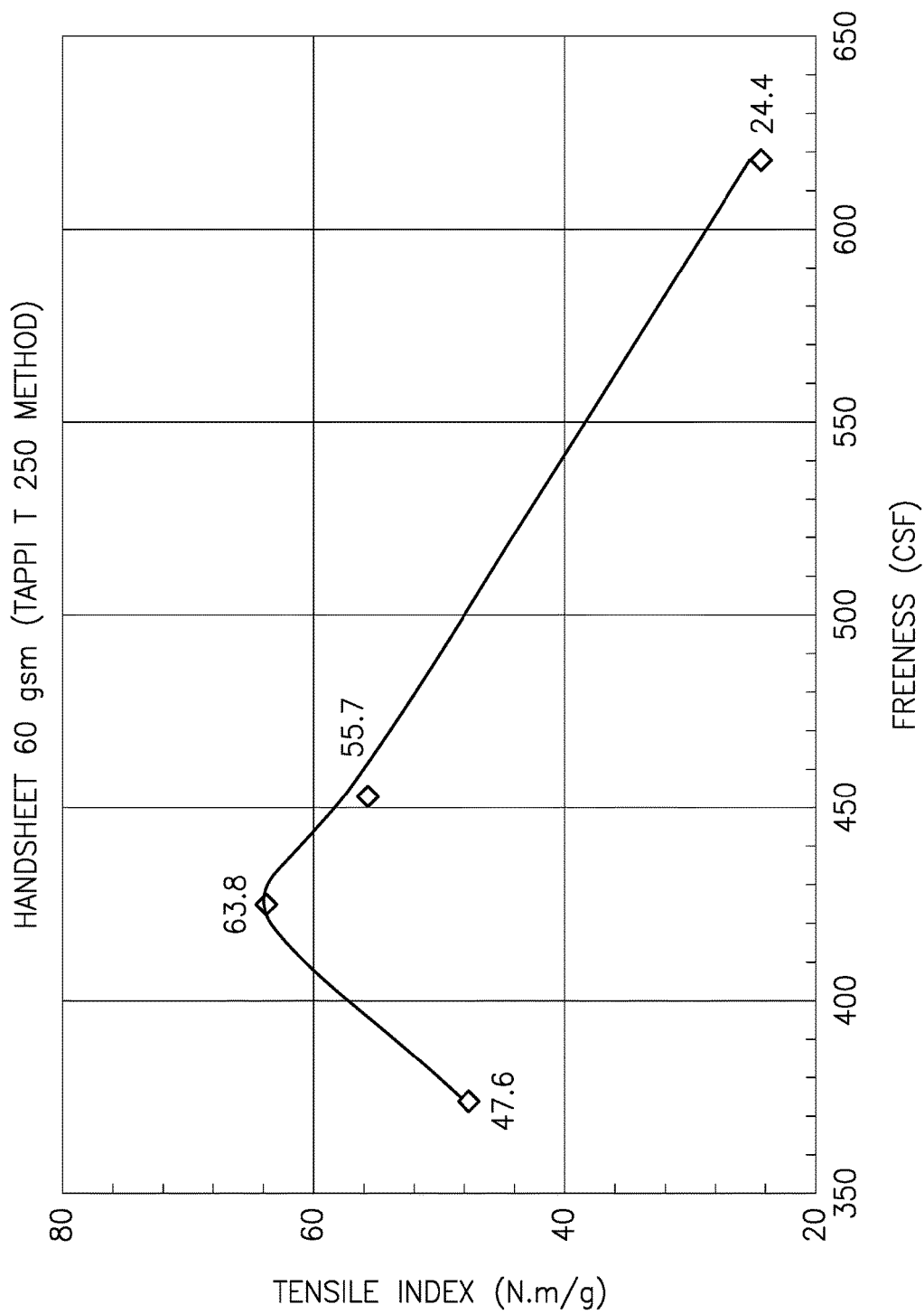
FIG. 19 is a graph illustrating a tensile index of base sheets according to embodiments of the disclosed subject matter.

FIG. 19 illustrates experimental results of pulp refining of Northern Bleach Softwood Kraft ("NBSK"). A horizontal axis corresponds to Canadian Standard Freeness ("CSF") levels and a vertical axis corresponds to a tensile index. TAPPI Standard Method T-205 was used to prepare 60 g/m² handsheets from NBSK pulp refined to different CSF levels. As shown in FIG. 19, by refining the NBSK pulp to various CSF levels, significant improvements to the tensile index may be achieved, such as a 160% in tensile index with about 425 CSF level respective to the non-refined pulp with about 617 CSF level.

In some embodiments, the base paper that forms paper straps may be reinforced by adding strength additives. The strength additives may be wet and/or dry, such as cationic starch, synthetic polymers, cellulose derivatives, and/or cellulose filaments.

In the various embodiments described herein, e.g., where non-twisted strings and/or twisted strings form paper straps in pultrusion machines via the various methods, systems, devices, apparatuses described herein addition of cellulose filaments may convey an advantage over other strength additives and cellulose derivatives, in particular, if the strings, for example, are wetted. Cellulose filaments can assist in improving the wet strength of paper into which they have been incorporated. This added wet strength can in turn offer better resistance to paper or web breakage during the wet paper making process. Further, the wet paper non-twisted strings, for example, will better resist the tension from the pulling action of the pultrusion machine thereby preventing string breakage during pultrusion and improving machine runnability.

Figure 20:
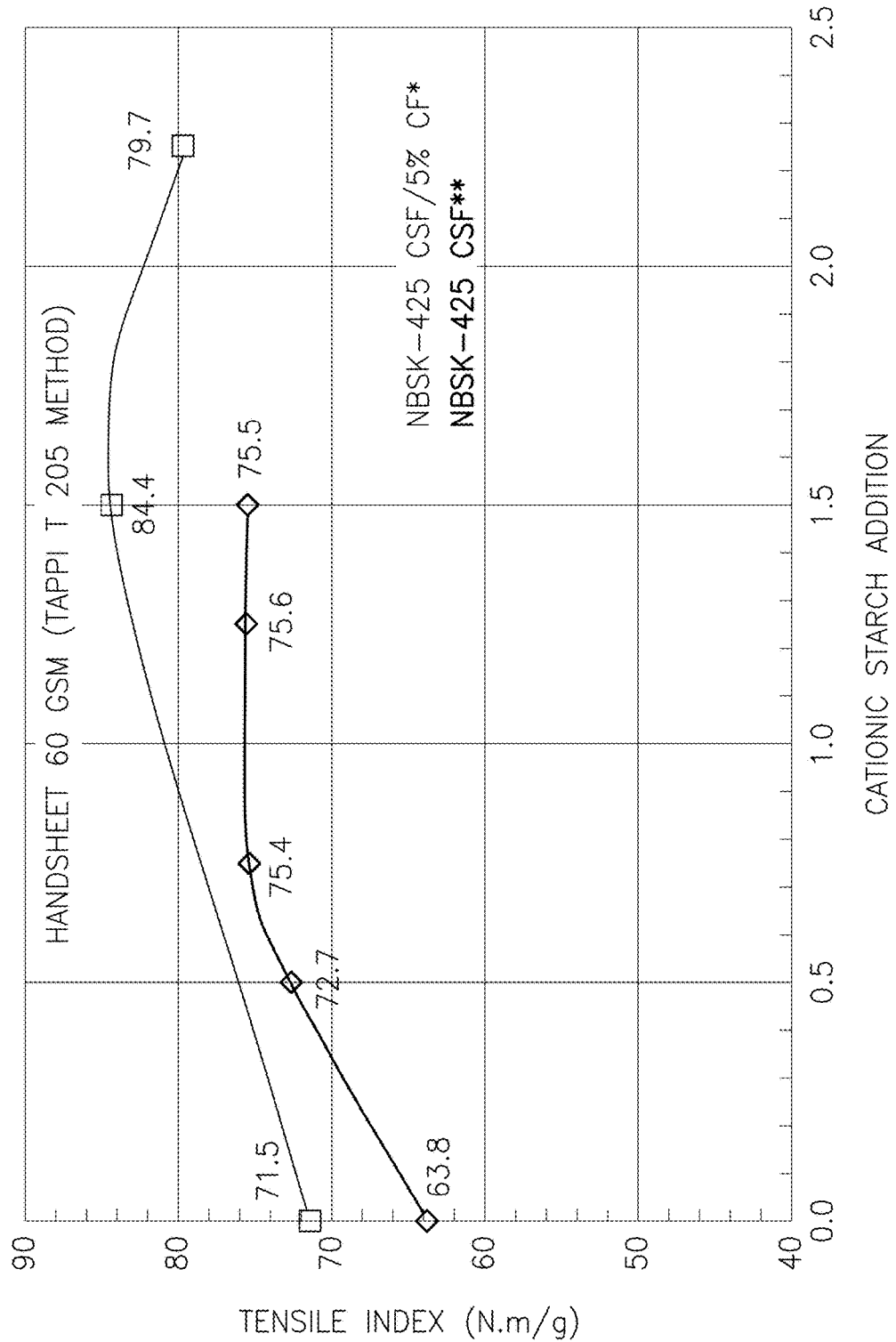
FIG. 20 is a graph illustrating a tensile index of base sheets according to embodiments of the disclosed subject matter.

FIG. 20 illustrates experimental results of the improvements to ultimate tensile strengths by adding strength additives. A horizontal axis corresponds to a w/w percentage of the strength additive and a vertical axis corresponds to a tensile index. TAPPI Standard Method T-205 was used to prepare 60 g/m² handsheets from NBSK pulp refined to 425 CSF level. Thereafter, cationic starch and/or cellulose filaments were added to the NBSK pulp. As shown in FIG. 20, addition of 0.75% w/w of cationic starch to the NBSK pulp increased the handsheet tensile index by up to about 18%. Further, a combination of both cationic starch at about 1.5% w/w and cellulose filaments at about 5% w/w to the pulp increased the handsheet tensile index by up to about 32%.

While the embodiments discussed above improve ultimate tensile strengths by reinforcement of the base sheet through pulp refining and/or adding strength additives, in other embodiments, the base sheet may also be improved by increasing the base weight of the base sheet, optimizing fiber orientation during paper making, or the like.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for forming a paper strap, the method comprising:
   providing a plurality of paper strips;
   directing each of the plurality of paper strips through a respective funneling die to form intermediate strings;
   directing each of the intermediate strings from the respective funneling die through a first pultrusion string die, the intermediate strings exiting the first pultrusion string die in a substantially non-twisted state to form non-twisted strings;
   impregnating the non-twisted strings with a water-soluble PVOH adhesive; and
   directing the non-twisted strings through a pultrusion strap die, the non-twisted strings forming the paper strap.

2. The method of claim 1, further comprising:
   compacting the plurality of paper strips by directing the paper strips through a tapered portion and a constant section portion of the funneling die.

3. The method of claim 1, wherein impregnating the non-twisted strings includes pulling the non-twisted strings against a top surface of a PVOH wetted-roller.

4. The method of claim 3 wherein the water-soluble PVOH adhesive comprises at least one of a water soluble flexibilizer and a water retention agent.

5. The method of claim 4 wherein the water soluble flexibilizer comprises polypropylene glycol.

6. The method of claim 4 wherein the water retention agent comprises sodium-carboxymethyl cellulose.

7. The method of claim 3, further comprising:
   heating the non-twisted strings after the non-twisted strings are wetted with the water-soluble PVOH adhesive.

8. The method of claim 1, further comprising:
   directing the non-twisted strings from first pultrusion string die through a plurality of pultrusion string dies.

9. The method of claim 8, wherein impregnating the non-twisted strings includes pulling the non-twisted strings against a top surface of a PVOH wetted-roller to impregnate the non-twisted strings with a water-soluble PVOH adhesive, the PVOH adhesive comprising at least one of a water retention agent and a water soluble flexibilizer.

10. The method of claim 9, further comprising:
    heating the non-twisted strings, the heating occurring when the non-twisted strings are directed through one of the plurality of pultrusion string dies.

11. The method of claim 1, further comprising:
    compacting the non-twisted strings by directing the non-twisted strings through a tapered portion and a constant section portion of the pultrusion strap die.

12. The method of claim 1, further comprising:
    guiding the non-twisted strings through a guiding and compacting roller system, the guiding and compacting roller system compacting and consolidating the non-twisted strings prior to directing the non-twisted strings through the pultrusion strap die.

13. The method of claim 1, further comprising:
    guiding the non-twisted strings through a guiding grooved roller, the guiding grooved roller compacting and consolidating the non-twisted strings prior to directing the non-twisted strings through the pultrusion strap die.

14. The method of claim 1, wherein impregnating the non-twisted strings includes injecting the water-soluble PVOH adhesive to coat the non-twisted strings with PVOH, the injecting occurring after directing the non-twisted strings into the pultrusion strap die, the PVOH adhesive comprising at least one of a water retention agent and a water soluble flexibilizer.

15. The method of claim 14, further comprising:
    heating the non-twisted strings after the non-twisted strings enter a tapered portion of the pultrusion strap die.

16. The method of claim 1 wherein the non-twisted strings formed after exiting the first pultrusion string die have a substantially solid cylindrical cross-sectional shape.

17. The method of claim 1 wherein the intermediate strings exiting the funneling die have a substantially cylindrical cross-sectional shape.

18. A method, comprising:
    providing a paper strip from a base sheet;
    directing the paper strip through a funneling die to form an intermediate string; and
    directing the intermediate string from the funneling die through a first pultrusion string die, the intermediate string exiting the first pultrusion string die in a substantially non-twisted state to form a non-twisted string, the non-twisted string having a substantially solid cylindrical cross-sectional shape.

19. The method of claim 18, further comprising:
    compacting the paper strip by directing the paper strip through a tapered portion and a constant section portion of the funneling die.

20. The method of claim 19, further comprising:
    compacting the intermediate string by directing the intermediate string through a tapered portion and a constant section portion of the first pultrusion string die.

21. The method of claim 18, further comprising:
    refining a pulp used to form the base sheet prior to providing the paper strip, the refining increasing a strength capability of the paper strip.

22. The method of claim 21, further comprising:
    adding a strength additive to the pulp prior to forming the base sheet.

23. The method of claim 22 wherein the strength additive includes at least one of a starch and a cellulose filament.

24. The method of claim 18, further comprising:
slitting the paper strip into a plurality of paper strip sections prior to forming the non-twisted string, the slitting increasing a strength capability of the non-twisted string.

25. The method of claim 24 wherein the slitting includes at least one of slicing and perforating the paper strip.

26. The method of claim 18, further comprising:
impregnating the non-twisted string by pulling the non-twisted string against a top surface of a PVOH wetted-roller to impregnate the non-twisted string with a water-soluble PVOH adhesive.

27. The method of claim 26 wherein the water-soluble PVOH adhesive comprises at least one of a water soluble flexibilizer and a water retention agent.

28. The method of claim 27 wherein the water soluble flexibilizer comprises polypropylene glycol.

29. The method of claim 27 wherein the water retention agent comprises sodium-carboxymethyl cellulose.

30. The method of claim 26, further comprising:
heating the non-twisted string, the heating facilitating activation of PVOH coated on the non-twisted string and compaction of the non-twisted string.

31. The method of claim 18, further comprising:
directing the non-twisted string from the first pultrusion string die through a plurality of pultrusion string dies, each one of the plurality of pultrusion string dies having a passageway, the passageway having a volume which decreases from a first one of the plurality of pultrusion string dies to each successive pultrusion string die.

32. The method of claim 31, further comprising:
impregnating the non-twisted string by pulling the non-twisted string against a top surface of a PVOH wetted-roller to impregnate the non-twisted string with a water-soluble PVOH adhesive, the PVOH adhesive comprising at least one of a water retention agent and a water soluble flexibilizer.

33. The method of claim 32, further comprising:
heating the non-twisted string to facilitate activation of PVOH coated on the non-twisted string and compaction of the non-twisted string, the heating occurring when the non-twisted string is directed through a last one of the plurality of pultrusion string dies.

34. The method of claim 18, further comprising:
coating the base sheet with an adhesive, the adhesive including PVOH.

35. The method of claim 34, further comprising:
directing the paper strip provided from the base sheet coated with PVOH based adhesive through a moistening system prior to directing the paper strip through the first one of a plurality of pultrusion string dies, the moistening system providing a liquid solution to activate the PVOH.

36. The method of claim 18 wherein the intermediate string exiting the funneling die has a substantially cylindrical cross-sectional shape.

37. A method, comprising:
providing a paper strip from a base sheet;
forming slits in the paper strip, the slits increasing a strength capability of a non-twisted string;
directing the paper strip through a first pultrusion string die to form an intermediate string; and
directing the intermediate string from the first pultrusion string die through a second pultrusion string die, the intermediate string exiting the second pultrusion string die in a substantially non-twisted state to form the non-twisted string.

* * * * *

UNITED STATES PATENT AND TRADEMARK OFFICE
CERTIFICATE OF CORRECTION

PATENT NO. : 10,309,061 B2
APPLICATION NO. : 15/172012
DATED : June 4, 2019
INVENTOR(S) : Halim Chtourou et al.

It is certified that error appears in the above-identified patent and that said Letters Patent is hereby corrected as shown below:

In the Claims

Column 21, Claim 8, Line 66:
"from first pultrusion" should read: --from the first pultrusion--.

Signed and Sealed this
Fourteenth Day of July, 2020

Andrei Iancu
*Director of the United States Patent and Trademark Office*